(12) United States Patent
Passler et al.

(10) Patent No.: US 12,267,807 B1
(45) Date of Patent: Apr. 1, 2025

(54) PASSIVE GEO LOCATION OF A WLAN DEVICE BY MERGING CIRCULAR ERROR PROBABILITY ELLIPSES BASED UPON SELECTION OF DATA SUBSETS

(71) Applicant: SR Technologies, Inc., Sunrise, FL (US)

(72) Inventors: Mark Passler, Boca Raton, FL (US); Kyle Patrick Kelly, Palm Beach Gardens, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/827,287

(22) Filed: Sep. 6, 2024

Related U.S. Application Data

(60) Provisional application No. 63/584,329, filed on Sep. 21, 2023.

(51) Int. Cl.
*H04W 64/00* (2009.01)

(52) U.S. Cl.
CPC .............................. *H04W 64/006* (2013.01)

(58) Field of Classification Search
None
See application file for complete search history.

(56) References Cited

U.S. PATENT DOCUMENTS

| | | | | |
|---|---|---|---|---|
| 9,921,294 | B2* | 3/2018 | Passler | G01S 5/06 |
| 11,627,548 | B1* | 4/2023 | Passler | G01S 5/0278 |
| | | | | 455/446 |
| 2006/0273960 | A1* | 12/2006 | Murphy | G01S 5/06 |
| | | | | 342/465 |
| 2017/0030998 | A1* | 2/2017 | Passler | G01S 5/06 |
| 2018/0249437 | A1* | 8/2018 | Lindskog | G01S 13/878 |
| 2021/0072341 | A1* | 3/2021 | Bocca | H04B 17/318 |
| 2023/0384412 | A1* | 11/2023 | Morrison | G06F 18/285 |

* cited by examiner

Primary Examiner — German Viana Di Prisco
(74) Attorney, Agent, or Firm — Goodwin Procter LLP

(57) ABSTRACT

A method of determining a location of a wireless device. The method includes receiving a plurality of beacons, via a measuring station, transmitted from the wireless device. For each beacon, a Times of Arrival (TOA), a Times of Departure (TOD), and a location of the measuring station is identified. A plurality of split time candidates are calculated based on an orbit period of the measuring station and a plurality of cluster modes are calculated for the identified TOAs. A plurality of optimal split times are selected based on the plurality of split time candidates, the plurality of cluster modes, and a beacon drift. A plurality of circular error probability (CEP) ellipses are generated corresponding to the plurality of optimal split times. The plurality of CEP ellipses are merged and a location of the wireless device is determined based, at least in part, on the merged CEP ellipse.

20 Claims, 20 Drawing Sheets

PASSIVE GEO LOCATION OF A WLAN DEVICE BY MERGING CIRCULAR ERROR PROBABILITY ELLIPSES BASED UPON SELECTION OF DATA SUBSETS

CROSS-REFERENCE TO RELATED APPLICATIONS

This application claims priority to U.S. Provisional Application No. 63/584,329, filed on Sep. 21, 2023 and titled "PASSIVE GEO LOCATION OF A WLAN DEVICE BY MERGING CEPs BASED UPON SELECTION OF DATA SUBSETS," the entire contents of which is incorporated herein by reference.

TECHNICAL FIELD

The present disclosure relates to a method and measuring station for geo-location of wireless devices and in particular to the geo-location of wireless local area network (WLAN) devices.

BACKGROUND

The location of WLAN devices can be performed by various means. This disclosure relates to the location of devices that are based upon the IEEE 802.11 technology, commonly known as Wi-Fi. Initially, it is noted that Institute of Electrical and Electronics Engineers (IEEE) Standard 802.11-2020 is used as a reference for disclosures provided herein, the entire contents of which are incorporated herein by reference. The IEEE 802.11-2020 Standard is commonly referred to as "Wi-Fi" and may be referred to as such or simply as "the Standard" herein. Various methods can be used to locate an access point (AP) or a station (STA). These methods may be classified as active, passive, and combined active and passive. In a passive location scheme, a measuring device monitors the time of arrival TOA of non-stimulated transmissions from a target device. In such passive location systems, it is common to use multiple measuring devices to determine the location of the target device. In such a scheme, simultaneous TOA measurements are taken by different measuring devices situated at different points, and from these measurements the location of the target device is calculated. For example, in a passive location scheme, the TOA of a transmission from the target may be simultaneously received at several sites. The difference in the TOAs between two sites is known as the time difference of arrival (TDOA). The TDOA is related to the difference in path lengths between the target and each receiving site, and for each pair of receivers, the TDOA results in a hyperbola along which the location of the target lies. The addition of a third site will provide a second hyperbola and the location of the target will be indicated by the interception of the two hyperbolas.

First review of the TDOA method will be provided so that differences with the proposed method and arrangements of the present disclosure can be readily understood. FIG. 1 is a diagram of a typical passive location system 100 which includes three wireless measuring stations 110a, 110b and 110c (referred to collectively herein as "wireless measuring stations" or "wireless measuring receivers"). The target is wireless device 120 can be, for example, a Wi-Fi Access Point (AP) that is to be located by the three wireless measuring stations. The distance of the wireless device 120 from wireless measuring station 110a is D1, 130. The distance of the wireless device 120 from receiving wireless measuring station 110b is D2, 140. The distance of the wireless device 120 from wireless measuring station 110c is D3, 150. A transmission from the wireless device 120 is received at each of the three wireless measuring stations 110a, 110b, and 110c, at times t1, t2, and t3 which are directly related to the distances D1, 130, D2, 140 and D3, 150. If the transmission from the wireless device 120 is at time T1, then it will be received at a wireless measuring station at time $(T1+D/c)$ where D is the distance of the wireless measuring station from the wireless device 120, and c is the speed of light. Hence, $t1=T1+D1/c$, $t2=T1+D2/c$ and $t3=T1+D3/c$. The TDOA for the measuring stations 110a and 110b is therefore $TDOA12=t1-t2=(D1-D2)/c$, and the TDOA for the measuring stations 110b and 110c is $TDOA23=t2-t3=(D2-D3)/c$. Methods for calculating the intersections of the two resulting hyperbolas are known.

FIG. 2 is a block schematic diagram of an exemplary IEEE 802.11 infrastructure network 200. A number of stations, 220a, 220b, 220c, 220d, 220e, and 220f (collectively referred to as "stations 220") are associated to a wireless device 120, such as an access point (AP), which, in turn, is connected to a hard wired distribution system, DS, 210. Thus, "wireless device," as used throughout this disclosure, need not be a totally wireless device and may be connected to a wired network. In such a network, wireless device 120 will transmit beacons periodically in order to allow mobile stations 220 to locate and identify the network and to convey information to the stations, in particular, the timestamp, beacon interval and capability information.

FIG. 3 is a diagram that depicts an example of the transmissions of the beacons with respect to the time axis 300. The wireless device 120 in FIG. 2, will attempt to transmit beacons, for example beacons 330, 340, 350, 360 and 370 at a regular time interval, tb, 310, known as Target Beacon Transmission time, TBTT. In practice, the time tb 320 between the two beacons may be greater or less than TBTT. The wireless device 120 advertises this ideal interval, TBTT, in the beacon frame, but the beacon transmission may be delayed beyond TBTT because of other traffic. In addition, because a beacon is never retransmitted, if the reception of the beacon at a station is corrupted for any reason, it is possible that that station may not receive every beacon. A field transmitted within every beacon is the Timestamp which is 64 bits long and contains the value of the wireless device's synchronization timer at the time that the frame was transmitted. This is known as the timer synchronization function, or TSF. In infrastructure network 200, associated stations 220 will update their own TSF timers with the value of the timer they receive from the wireless device 120 in the beacon frame, modified by any processing time required to perform the update operation. Hence, associated stations 220 maintain synchronous timing with the wireless device 120. When the beacon TOA is being measured by an un-associated wireless measuring station, then the corresponding wireless measuring station (e.g., wireless measuring station 110a, 110b, or 110c) will not update its timer to synchronize with the wireless device TSF but will measure the TOA using its own timer. The timer accuracy within a wireless device 120 may be up to 5 parts per million (ppm) (i.e., for every million ticks of a clock, the maximum deviation will be 5 ticks) and hence the relative drifts between the timers of the wireless device and the wireless measuring stations needs to be assessed. It should be appreciated that the timer accuracy within the wireless device 120 may be expressed in a different format (i.e., 5 microsecond of error per second).

The TDOA approach as described above requires multiple wireless measuring receivers with disparate measurement of the same signal whose timing needs to be processed at a central analysis point. In this approach, it is required that the exact position of each of the receivers is known. An alternative approach is to use a single mobile wireless measuring station 110.

When the beacon TOA is being measured by the unassociated wireless measuring station 110, the wireless measuring station 110 will not update its timer to synchronize with the wireless device TSF but will measure the TOA using its own timer. A common tolerance for the timer within a wireless device 120 is 3-5 ppm and hence the relative drift between the timers of the wireless device and the measuring stations needs to be assessed and compensated for.

Methods and arrangements relating to the assessment and compensation of the relative drift between the TSF timer in the beacons from the wireless device 120 received by the wireless measuring station 110, the reported TOD, and the TOA measurement by the measuring station 110, and synchronization between the timers of the wireless device 120 and the wireless measuring station 110, are known. In one such known method, the synchronization may include applying a factor $\alpha$ for correcting the offset of the timer associated with the wireless measuring station 110, applying a factor $\beta$ for correcting a ratio of timer rates between the two timers, and applying a factor $\gamma$ for correcting changes in a timer rate ratio between the two timers.

Over time, more and more time of flight (TOF) measurements, where TOF=TOA−TOD, will be taken by the wireless measuring station 110. It could be assumed that the more measurements, the better the accuracy of the location calculations, but this assumes that the values for $\alpha$, $\beta$ and $\gamma$ are somewhat constant. In the general sense, as time progresses, there is an increasing chance that the relative timer drift between the wireless device 120 and the wireless measuring station 110 can undergo a change such that the values for $\beta$ and $\gamma$ change significantly. Hence, as more measurements are taken, changes in the values for $\beta$ and $\gamma$ may cause significant changes in the calculated location of the wireless device 120 rendering the location estimate progressively more inaccurate.

The location estimate may be calculated with a circular error probability (CEP) ellipse. The merging of CEPs is known but determining ideal points/times when to merge CEPs is required in order to achieve the best accuracy.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

In various examples, the subject matter described herein relates to determining a location of a wireless device. According to some embodiments, a measuring station receives a plurality of beacons transmitted from the wireless device. A plurality of Times of Arrival (TOAs), a plurality of Times of Departures (TODs), and a plurality of locations of the measuring station at which the plurality of beacons are received are identified for the plurality of beacons. A plurality of Times of Flight (TOFs) are determined for the plurality of beacons based at least in part on the plurality of TOAs and the plurality of TODs. An orbit period of the measuring station is determined based on the plurality of locations of the measuring station. A plurality of split time candidates are calculated based on the orbit period. A plurality of cluster modes are calculated for the plurality of TOAs via a clustering algorithm. A beacon drift is calculated based on a difference between a plurality of estimated distances between the wireless device and the measuring station and a plurality of distances derived from the plurality of TOFs. A plurality of optimal split times are selected based on the plurality of split time candidates, the plurality of cluster modes, and the beacon drift. A plurality of circular error probability (CEP) ellipses corresponding to the plurality of optimal split times are generated and merged to produce a merged CEP ellipse. A location of the wireless device is determined based, at least in part, on the merged CEP ellipse.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
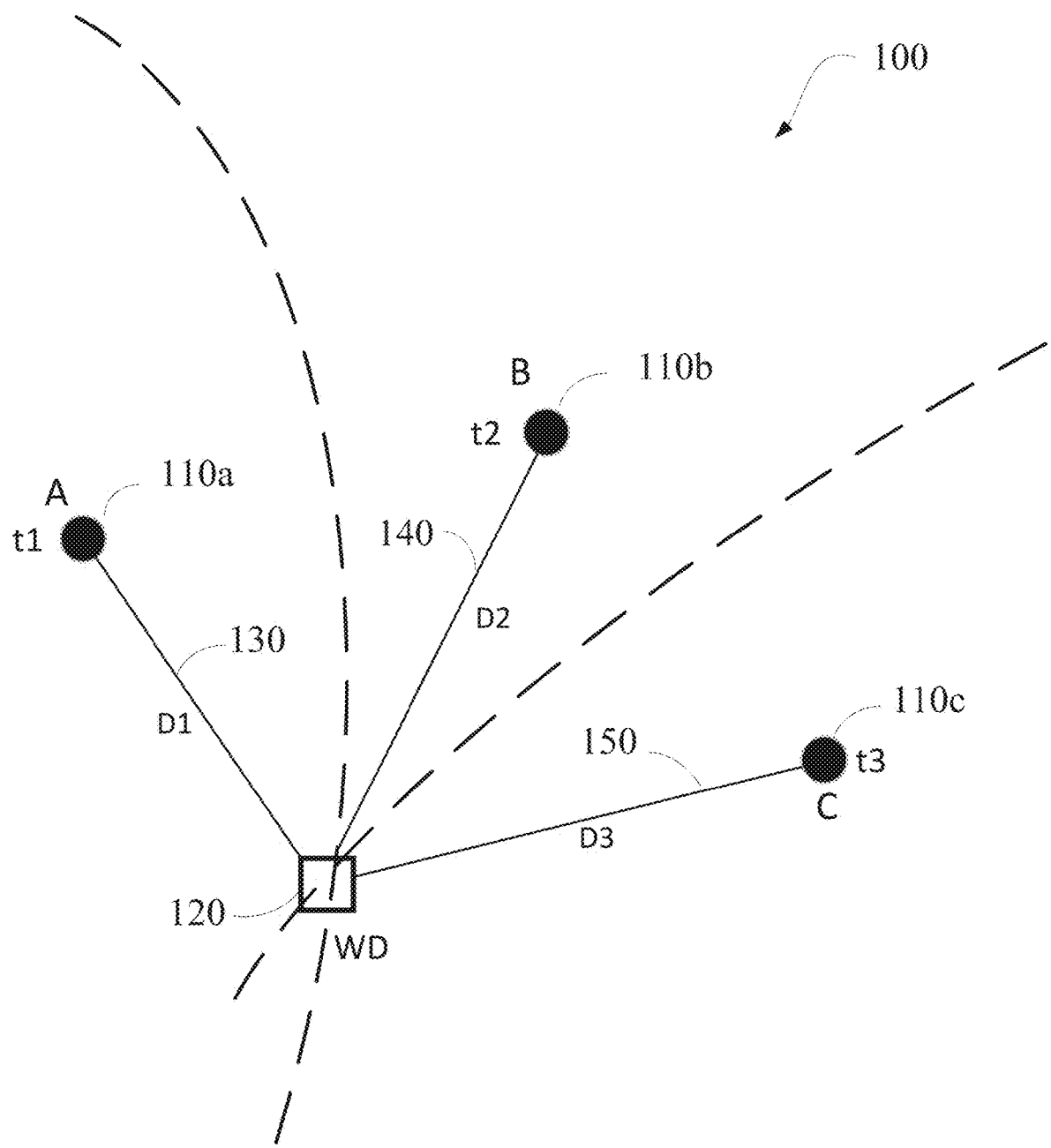
FIG. 1 is a diagram of a typical passive location system with three wireless measuring stations, in accordance with some embodiments.
Figure 2:
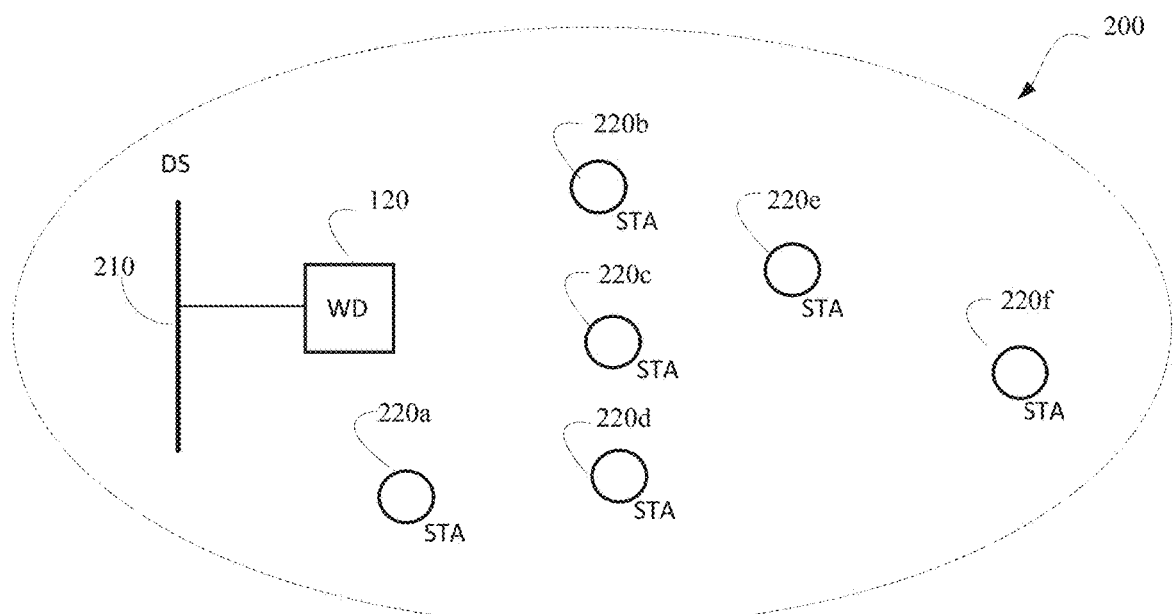
FIG. 2 is a block schematic diagram of an exemplary IEEE 802.11 infrastructure network, in accordance with some embodiments.
Figure 3:
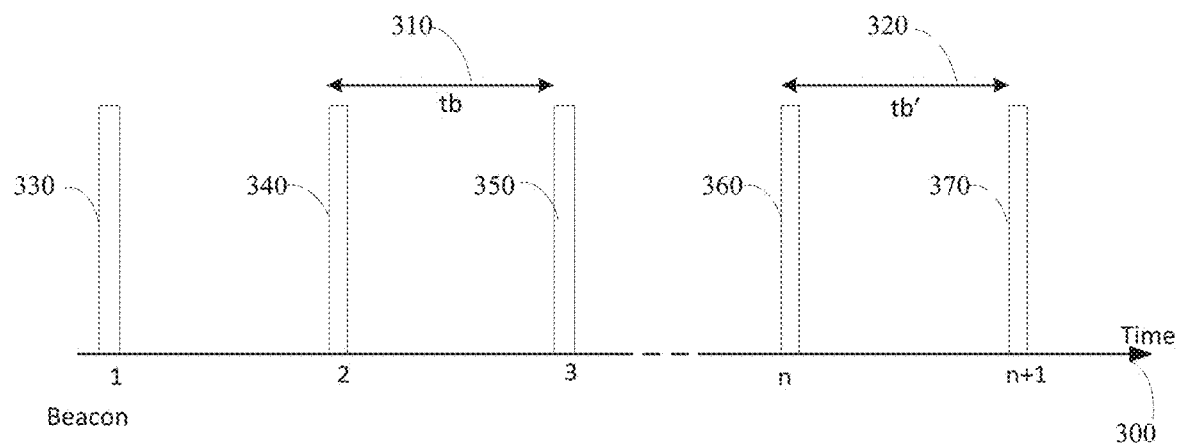
FIG. 3 is a diagram depicting transmissions of beacons with respect to a time axis, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

The method and apparatus disclosed herein calculate a Time of Flight (TOF), break up the TOFs into segments based upon optimized split times, calculate respective circular error probability (CEP) ellipses, and merge the CEP ellipses to provide a best overall CEP ellipse.

Figure 4:
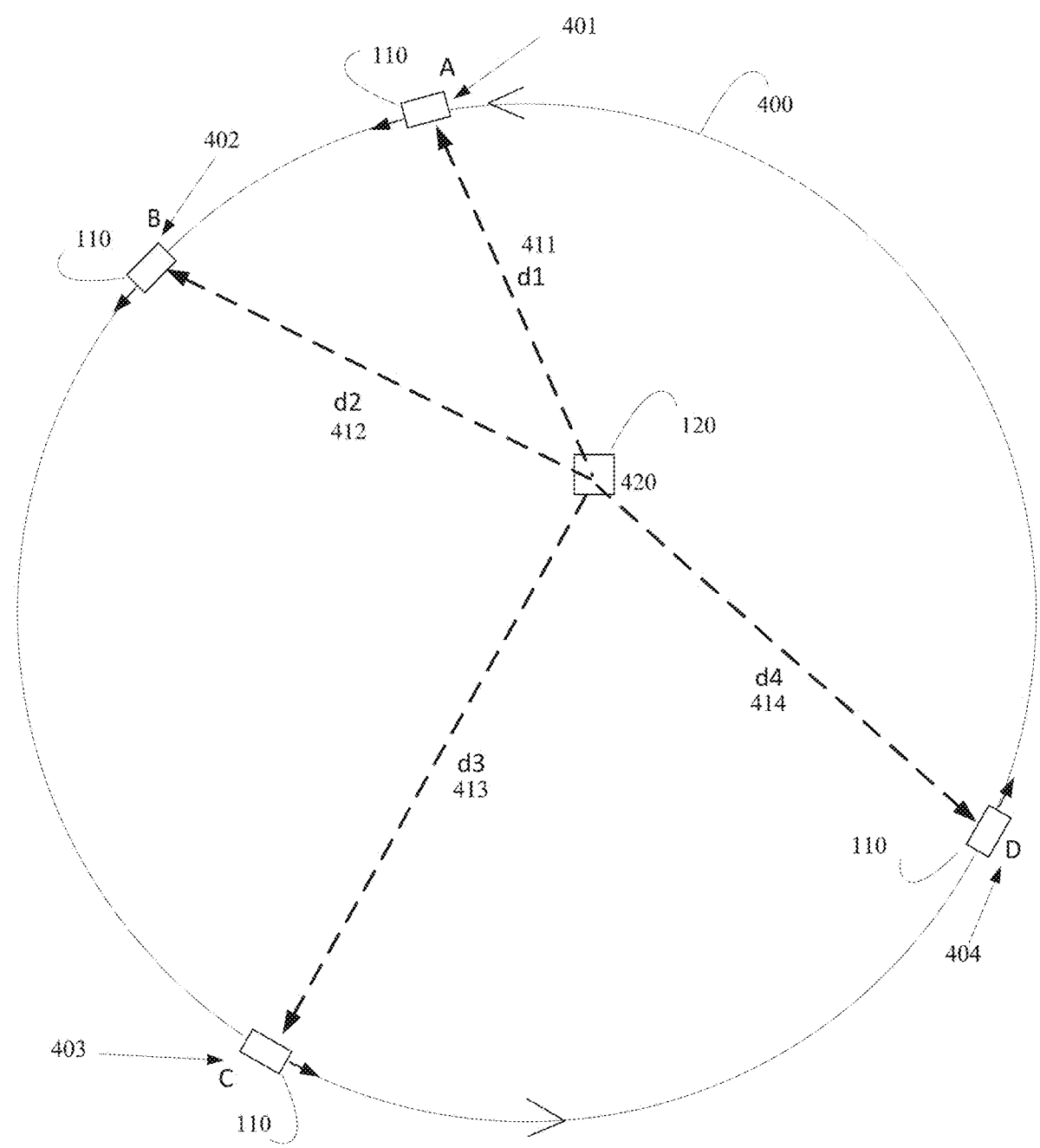
FIG. 4 is an example of a passive location system with a single wireless measuring station moving in an orbit and measuring TOAs of beacons from a wireless device at a location within the orbit, in accordance with some embodiments.

Referring again to the drawing figures in which like reference designators refer to like elements, FIG. 4 is an example of a passive location system using a single wireless measuring station 110 and depicts a scenario where the wireless measuring station 110 is moving in an orbit 400 measuring TOAs of beacons transmitted from a wireless device 120 at location 420, which is within orbit 400. In this example, the wireless measuring station 110 is moving counter clockwise. As wireless measuring station 110 moves along the orbit 400, wireless measuring station 110 is constantly measuring the TOAs of the beacons that are transmitted by the wireless device 120. The distances between the wireless measuring station 110 and the wireless device 120, when the wireless measuring station 110 is at points A 401, B 402, C 403 and D 404 are d1 411, d2 412, d3 413 and d4 414, respectively. If the time that each beacon is transmitted and the time of departure, TOD, is known, then the time of flight, TOF, of the transmission is the difference between TOA and TOD (i.e., TOA-TOD). The TOF of the beacon transmission from wireless device 120 to the wireless measuring station 110 will be proportional to the distance between the wireless measuring station 110 and the wireless device 120 at each point. Many different flight patterns for the wireless measuring station 110 may be used and the circular pattern depicted by orbit 400 is just one of many possible patterns. In this example, the wireless measuring station 110 may be airborne and flying in an orbit around an area of interest that contains the target of interest, i.e., wireless device 120.

In order to use a single wireless measuring station 110, the times of a series of TODs from a target wireless device are recorded and TOA measurements at the wireless measuring station are taken. A synchronization function for the timers of the target wireless device and wireless measuring device may be derived and used to determine the target location.

One method of measuring the TOA of the beacon at the wireless measuring station 110 is to use the internal TSF timer of the receiver of the wireless measuring station 110. However, in this case, the TOA time would be in 1 microsecond (μs) increments. To improve the time measurement, the TOA may be measured directly from the clock, typically having a frequency of 20 or 40 MHz, in the wireless measuring station 110 to produce better accuracy. By way of example and not limitation, the wireless measuring station 110 may be located in a mobile ground vehicle, a vessel at sea or on water, or in a vehicle that is airborne.

Methods for using (i) the TSF timer in the beacon, (ii) the reported TOD, (iii) the TOA measurement by the measuring station 110, and (iv) the elimination of the relative drifts and offset (i.e., synchronization, between the timers of the wireless device 120 and the measuring station 110) are known to a person skilled in the art. However, a more complete understanding of the present disclosure, and the attendant advantages and features thereof, will be more readily understood by providing the following outline of such a method.

Because the timer on the wireless device 120 and the timer on the wireless measuring station 110 are rarely aligned, three terms can be defined. Term $\alpha$, representing the offset between the two timers at some point in time; term $\beta$, representing the ratio of timer rates between the two timers at some point in time; and term $\gamma$, representing the time-related change in timer rate ratio $\beta$ between the two timers at some point in time. A method is performed that includes, after at least one orbit has been completed, recording the TOAs of beacons at several points, e.g., points A 401, B 402, C 403, and D 404, together with the reported or scheduled TODs. After one orbit has been completed, wireless measuring station 110 will be located at a series of the same locations as before and hence the relative time drift can be estimated, and the travel times estimated. Then, using the known positions of the wireless measuring station 110, an approximate location for the wireless device 120 can be estimated. To estimate the travel times, the timers of the wireless device 120 and wireless measuring station 110 must be synchronized. A sum of square residuals (SSR) and application of parametric optimization algorithms, like the Levenberg-Marquardt Algorithm (LMA), may be used to programmatically vary the wireless device latitude, wireless device longitude and the three moments $\alpha$, $\beta$, and $\gamma$ such that the smallest SSR is produced. The above technique is referred to as "timer synchronization ranging" (TSR) and is a known technique.

As time progresses, and, for example, as the wireless measuring station 110 completes additional orbits, for example orbit 400, a first assumption might be that the calculation of the position of the wireless device 120 would become more accurate. However, as time progresses, the occurrence of a drift extrema in the relative clocks of the wireless measuring station 110 and the wireless device 120 becomes more likely. An extrema in the relative drift will cause significant inaccuracies in the calculation of the CEP ellipse as the LMA and SSR technique tries to find a solution based upon all the data. Calculating separate CEP ellipses from a set number of orbits and then merging them is a known method to counter the drift problem; and in this case, the merged CEP ellipse is compared to the CEP ellipse derived from all the data, and the better CEP ellipse is selected. This method is also known. However, by determining and selecting optimum points in the orbits to create optimum "split times", CEP ellipses may be derived for each split time and then merged to derive a more accurate CEP ellipse.

Figure 5A:
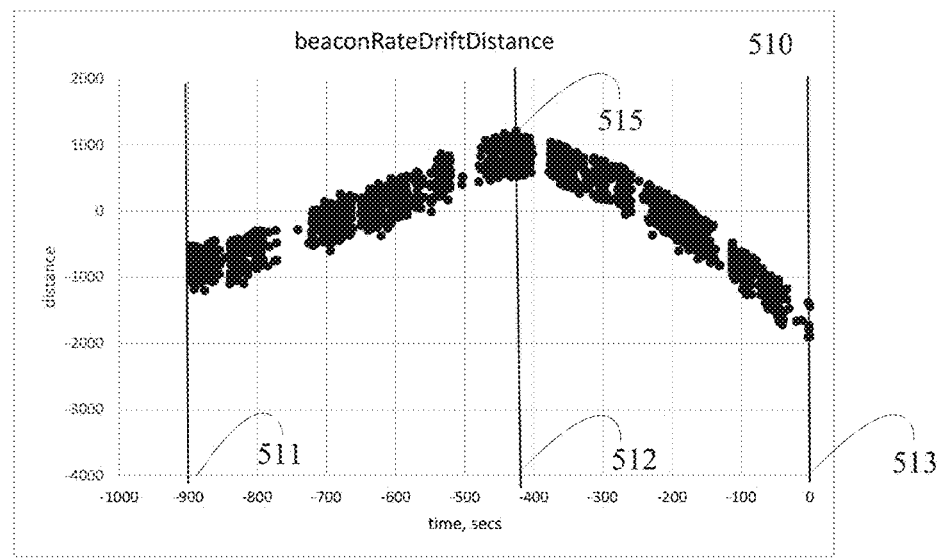
FIGS. 5A, 5B, and 5C depict graphical examples of beacon drifts after an offset a and a linear drift 8 have been calculated, in accordance with some embodiments.
Figure 5B:
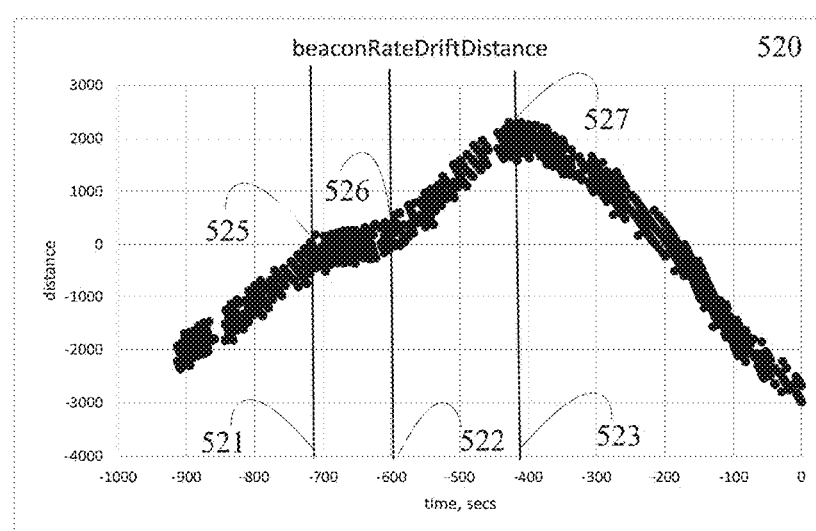
Figure 5C:
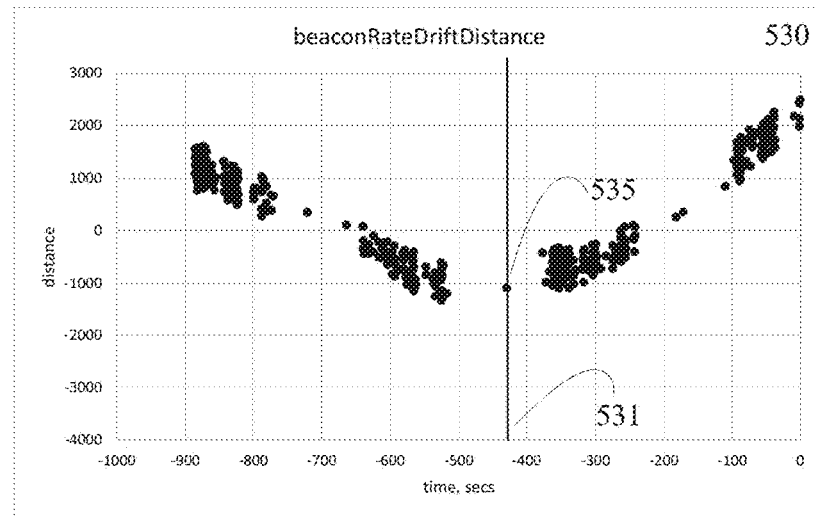

FIGS. 5A, 5B, and 5C depict graphical examples of beacon drifts, 510, 520, and 530, respectively, after the offset a and linear drift ẞ have been calculated. After one or two orbits, a value for a may be calculated as the wireless measuring station 110 has returned to the same location at least two times. This method is known. In FIG. 5A, graph 510, from time −900 seconds, 511, to about time −410 seconds, 512, the drift is substantially linear, and similarly between time −410 seconds, 512, and time 0 seconds, 513, the drift is substantially linear. At time −410 seconds, 512, however, a drift extrema point 515 is present indicating a change in timer rate ratio between the timers in the wireless device 120 and the wireless measuring station 110. In general, it would be desirable to find regions of the drift that can be represented by straight lines or lines with moderate constant curvature. For example, in some instances the drift over several orbits may exhibit an overall positive or negative curvature depending on whether the relative timer frequencies are drifting faster or slower. The regions that cannot be represented by straight or constant curvature lines are those regions where the slope of the drift (also referred to herein as slope) changes from positive to negative and/or vice versa. This is because these extrema in drift also exhibit extrema in the curve itself. In FIG. 5B, graph 520 shows three points, 525, 526, and 527 where the slope changes significantly at times −710 seconds, 521, time −600 seconds, 522, and time −410 seconds, 523, respectively. At points 525 and 526 the slope of the beacon drift remains in the same direction, i.e., positive. At extrema point 527, however, the slope changes from positive to negative, indicating a major change in the relative beacon drift. In FIG. 5C, graph 530 shows a single extrema point 535 at time −430 seconds 531. Extrema points 515, 527 and 535 are all points where the slope changes and where the slope of the drift changes direction.

A more complete understanding of the present disclosure, and the attendant advantages and features thereof, will be more readily understood by first describing an outline of the method that determines the optimum split times. The details of each of the steps of the overall method will then be described separately.

Figure 6:
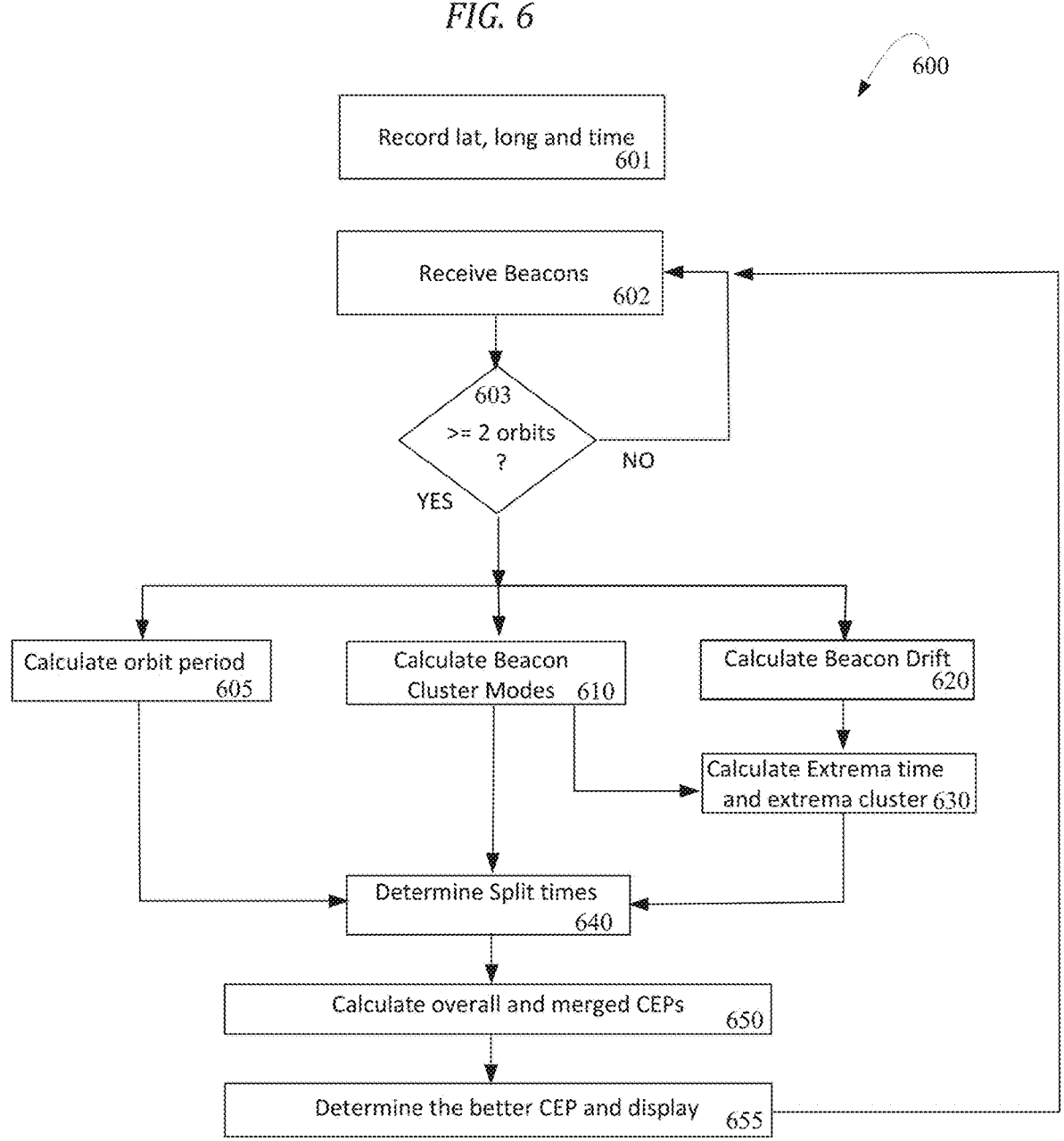
FIG. 6 is an example flowchart of a method disclosed herein, in accordance with some embodiments.

FIG. 6 is an example flowchart 600 of one embodiment of the disclosed method as may be performed by wireless measuring station 110 shown in FIG. 4. Throughout the method shown in flowchart 600, the latitude, longitude, and time information for the wireless measuring station 110 is recorded at regular intervals according to step 601. At step 602 beacons from the wireless device 120 are received by the wireless measuring station 110. As depicted in FIG. 4, wireless measuring station 110 may be orbiting the wireless device 120 and receiving beacons from it. With each received beacon the position of the wireless measuring station 110 will also be recorded. It is noted that the beacon reception rate around the orbit 400 will tend to be uneven. At step 603, the method checks whether 2 or more orbits have been completed. If it is determined that at least two orbits have been completed, the method proceeds to steps 605, 610, and 620. This check may be performed using the positional data that is continuously being collected and stored at step 601.

At step 605 the orbit period is calculated. As discussed below with reference to FIGS. 9, 10, and 11, the orbit period, $t_{orb}$, is re-calculated at a set time interval, $T_1$, but only updated at a time "orbit period update" at step 605.

Step 610 calculates the beacon cluster modes using a non-parametric mean-shift clustering algorithm, such as a kernel density estimation KDE. The KDE approach can be utilized to seek out the modes of a distribution on the received beacon TOA data set. As discussed below with reference to FIG. 12, the beacon cluster modes are calculated every set time period $T_2$ and the modes are used in the algorithm to select the optimum split times.

At step 620, the beacon drift is calculated. As discussed below with reference to FIG. 14, first, using SSR and LMA with the α and β terms (offset and linear drift), the location of the target wireless device 120 is estimated; then the residual (i.e., the difference between the distances to the target wireless device 120 and the wireless measuring device 110, and the corresponding TOFs converted to distance) is calculated. This residual is termed the 'beacon drift' and is the second and higher orders relative time drift (i.e., the β and γ terms of a timer drift expressed in a polynomial form $\alpha+\beta t+\gamma t^2$) between the time clocks of the wireless device 120 and the wireless measuring device 110.

At step 630, the beacon drift calculated in step 620 is examined to determine if there is an extrema, and if so, determine the time it occurred. The details of the extrema calculations are discussed below with reference to FIG. 14. If an extrema time is identified, then an extrema cluster is calculated based upon the beacon cluster modes derived in step 610.

At step 640, the optimum split times are calculated with inputs from steps 605, 610 and 630. The details regarding the determination of the split times are discussed below with reference to FIGS. 19A-19C.

Having determined optimum split times at step 640, at step 650 the individual CEP ellipses for the periods between the split times are calculated and merged. An overall CEP ellipse using all the data points is also calculated and at step 655, the better CEP ellipse is selected and displayed. The selection may be based upon which of the two CEP ellipses has the greater location stability with increasing data. The details of the split time and split time periods are discussed below with reference to FIG. 22.

Figure 7:
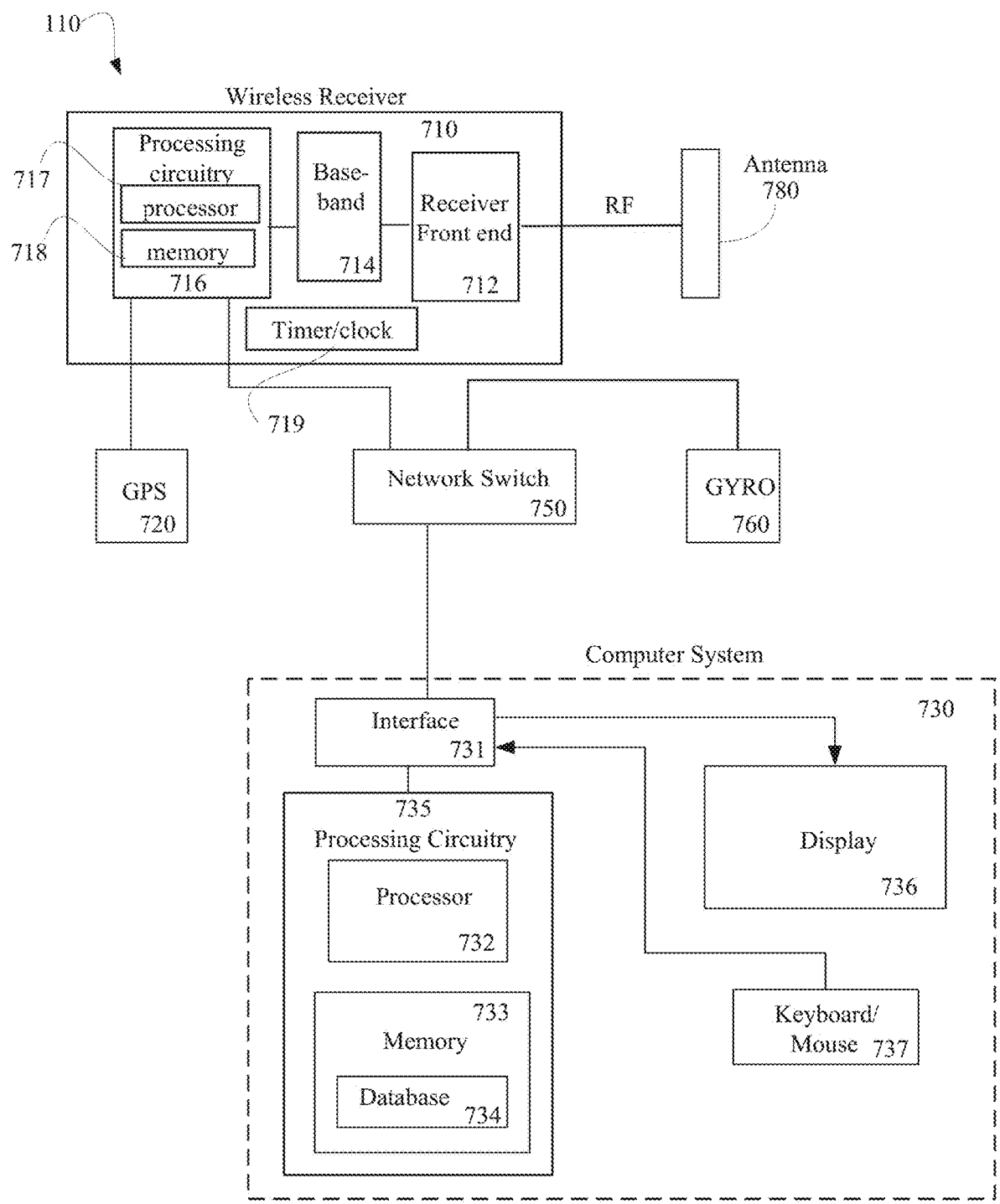
FIG. 7 illustrates an exemplary wireless measuring station, according to embodiments of the present disclosure, in accordance with some embodiments.

FIG. 7 illustrates exemplary internal components of wireless measuring station 110 shown in FIG. 4, according to embodiments of the present disclosure. Wireless measuring station 110 may be any device operable to wirelessly receive signals and execute any of the methods illustrated in the present disclosure. By way of example and not limitation, wireless measuring station 110 may be a station, an access point, or the like. It may be a wireless device that is based upon the IEEE 802.11 specification. In one embodiment, wireless measuring station 110 may include an antenna 780, a wireless receiver 710, a computer system 730, a global positioning system (GPS) 720, a gyroscope 760 (gyro 760), and a network switch 750 such as an Ethernet switch.

The wireless receiver 710 may receive radio frequency (RF) signals from the antenna 780. The GPS 720 output may be connected to the wireless receiver 710. The GPS 720 may provide the latitude, longitude, and altitude of the wireless measuring station 110. The wireless receiver 710 may append GPS information to any RF reception (e.g., to a beacon). The network switch 750 may be connected to the wireless receiver 710, the gyro 760, and the computer system 730. The wireless receiver 710 includes a receiver front end 712, a baseband 714, processing circuitry 716, and a timer/clock 719. The receiver front end 712 may perform usual functions of an RF receiver front end, such as low noise amplification, filtering, and frequency down conversion so as to condition the received signal suitable for inputting to the baseband 714. Baseband 714 may perform the usual functions of a baseband, such as demodulation, descrambling, and error correction of received packets as described in the IEEE 802.11 Standard. The processing circuitry 716 may include a processor 717 and a memory 718. In addition to a traditional processor and memory, processing circuitry 716 may comprise integrated circuitry for processing and/or control, e.g., one or more processors, and/or processor cores, and/or FPGAs (Field Programmable Gate Array), and/or ASICs (Application Specific Integrated Circuitry). Processor 717 may be configured to access (e.g., write to and/or read from) memory 718, which may include any kind of volatile and/or non-volatile memory, or combinations thereof, such as cache, and/or buffer memory, and/or RAM (Random Access Memory), and/or ROM (Read-Only Memory), and/or optical memory, and/or EPROM (Erasable Programmable Read-Only Memory), etc. Additionally, memory 718 may be configured to store code executable by processor 717 and/or other data, including but not limited to data pertaining to communication, like configuration and/or address data of nodes, etc.

Processing circuitry 716 may be configured to control any of the methods and/or processes described herein and/or to cause such methods and/or processes to be performed, e.g., by wireless measuring station 110. Corresponding instructions may be stored in memory 718, which may be readable by processor 717. Processing circuitry 716 may include a microprocessor, and/or microcontroller, and/or FPGA device, and/or ASIC device. The GPS information may be provided to the processing circuitry 716 by GPS 720. RF receptions, e.g., beacons, may have GPS information added such that the position of the wireless measuring station 110 is known for each received signal. The GPS information, together with information related to the received signals, may be sent to the network switch 750 and therefore made available to the computer system 730. In some embodiments, the network switch 750 is an Ethernet switch.

The computer system 730 may include interface 731, which may contain an Ethernet connection to the network switch 750, a connection to a display 736, a connection to a keyboard and mouse 737. Interface 731 may also interface with processing circuitry 735. In some embodiments, processing circuitry 735 may include a processor 732, a memory 733, and a database 734. Database 734 may contain the ground mapping information of the area of interest, and the processor 732 and memory 733 may be used to carry out all or part of the exemplar processes described herein. The processor 732 and memory 733 may be used to carry out processes for the geo-location of the target wireless device 120 using the TOD and TOA times as reported by processing circuitry 716 in the wireless receiver 710, information on the position of the measuring station 110 derived from GPS 720 and gyroscope 760, and information on the wireless device 120 which may be inputted using the keyboard/mouse 737 The display 736 may be used to present to a user the ground map together with the estimated location of the wireless device 120 in the form of a CEP ellipse with a center.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" or "being communicatively coupled", which is not limited to a physical connection nor a direct connection. It is contemplated that the signal path between one element and another may traverse multiple physical devices.

Thus, in some embodiments, processing circuitry 735 may include the memory 733 and a processor 732, the memory 733 containing instructions which, when executed by the processor 732, configure the processor 732 to perform the one or more functions described herein. In addition to a traditional processor and memory, the processing circuitry 735 may include integrated circuitry for processing and/or control, e.g., one or more processors, and/or processor cores, and/or FPGAs, and/or ASICs.

The processing circuitry 735 may include, and/or be connected to, and/or be configured to access (e.g., write to and/or read from) memory 733, which may include any kind of volatile and/or non-volatile memory, e.g., cache, and/or buffer memory, and/or RAM, and/or ROM, and/or optical memory, and/or EPROM. Memory 733 may be configured to store code executable by control circuitry and/or other data, including data pertaining to communication, such as configuration and/or address data of nodes, etc. The processing circuitry 735 may be configured to control any of the methods described herein and/or to cause such methods to be performed, e.g., by the processor 732. Corresponding instructions may be stored in memory 733, which may be readable and/or readably connected to the processing circuitry 735. In other words, the processing circuitry 735 may include a controller, which may comprise a microprocessor, and/or microcontroller, and/or FPGA device, and/or ASIC device. It may be considered that the processing circuitry 735 includes or may be connected or connectable to memory, which may be configured to be accessible for reading and/or writing by the controller and/or processing circuitry 735.

According to an embodiment of the disclosure, wireless receiver 710 is arranged to receive transmissions of another wireless device 120 and processing circuitry 716 is arranged to monitor an attribute of the beacon transmissions of wireless device 120 and determine the value of the TSF field in the beacons of wireless device 120. In addition, according to an embodiment of the disclosure, wireless receiver 710 is arranged to measure the time of arrival of the received beacon transmissions of wireless device 120. This may be accomplished by outputting the value of the TSF timer, or another internal timer/clock 719, of the wireless measuring station 110 that corresponds to a precise point in time when the beacon was received. In one embodiment, this point in time may correspond to the time when the frame check is completed. In other embodiments, the point in time may be taken at various other points in the received beacon; for example, the time when the clear channel assessment (CCA) of wireless measurement station 110 was exerted by the beacon reception, or the point where the header of the beacon is verified. This timing may also be accomplished by outputting a trigger that is timed to coincide with the reception of the beacon from wireless device 120. This trigger may correspond to any known point within the reception of the beacon. This trigger may then be used to read the time from an internal timer/clock 719. Timer/clock 719 may have a precision that is higher than the internal TSF timer that is part of the wireless measuring station 110.

According to an embodiment of the disclosure, computer system 730 may be connected to wireless receiver 710. Computer system 730 may be a computer system with an associated display module such as a laptop or tablet computer, or may be a computer system with a separate display monitor. Computer system 730 may be used as an operator interface for wireless measuring station 110 that displays the location of wireless devices 120 on a digital grid or map. The calculations described in this disclosure may be performed using software in the processing circuitry 735, the required timing information being provided by an interconnection link with wireless receiver 710.

In some embodiments, a wireless measuring station 110 for determining a location of a wireless device 120 (e.g., a wireless access point) is provided. The wireless measuring station 110 is configured to receive a plurality of beacons from the wireless device 120. The wireless measuring station 110 includes processing circuitry 716, having a memory 718 in communication with a processor 717. The memory 718 is configured to store instructions that, when executed by the processor 717, configure the processor 717 to perform a variety of tasks. In one embodiment, these tasks involve identifying a plurality of TODs of a corresponding plurality of beacons received at wireless measuring station 110, with each of the plurality of TODs indicating when the wireless device 120 transmitted a beacon to the wireless measuring station 110 according to a timer associated with the wireless device 120. The tasks may further involve identifying a plurality of TOAs corresponding to the plurality of beacons at the wireless measuring station 110 according to a timer/clock 719 associated with the wireless measuring station 110, and synchronizing the timer associated with the wireless device 120 with the timer/clock 719 associated with the wireless measuring station 110. Synchronizing the timers includes applying an offset factor α for aligning the timer associated with the wireless measuring station 110 when the wireless measuring station 110 receives the plurality of beacons, and applying a factor β for correcting a ratio of timer rates between the timer associated with the wireless device 120 and the time/clock 719 associated with the wireless measuring station 110. The synchronization may further include applying a factor γ for correcting the changes in the ratio of frequency drifts in the timer associated with the wireless device 120. The processor 717 is further configured to determine a plurality of TOFs corresponding to the plurality of beacons. The plurality of TOFs are based at least in part upon the plurality of TODs, the plurality of TOAs, and the synchronization of the timer associated with the wireless device 120 and the timer/clock 719 associated with the wireless measuring station 110. The processor 717 is configured to determine a location of the wireless device 120 based at least in part on the determined plurality of TOFs and the synchronization of the timer associated with the wireless device 120 and the timer/clock 719 associated with the wireless measuring station 110. In some embodiments, the processing circuitry 735 may be used either in place of or together with the processing circuitry 716 for the synchronization of the timers and calculations of the TOFs. The plurality of TOFs, together with the location information of the wireless measuring station 110 for each TOF, may then be used to calculate a location for the wireless device 120. The location may include a CEP ellipse with a center. A new CEP ellipse may be calculated for every split time.

Such calculations may take place in processing circuitry 716 in the wireless receiver 710 and/or the processing circuitry 735 in the computer system 730. Furthermore, as discussed above with reference to FIG. 6, the CEP ellipses calculated for each split time may then be merged to produce a single CEP ellipse.

A new CEP ellipse may be calculated for every split time. The longer the period used for CEP determination, the more possibility that the relative timer drift 8 becomes non-linear or that the relative drift exhibits second and higher order components. However, the shorter the period, the fewer TOFs are gathered, and hence, the CEP accuracy will be low, which leads to large CEP ellipses. In known passive geolocation schemes, the accuracy can be improved and synchronization calculations become more accurate at the point that the wireless measuring station 110 returns or is near to a position that it has occupied earlier. That is, if the measuring station 110 is at the same position at two different times, the TOFs measured at this position should be the same and therefore estimates of the synchronization can be carried out. Hence, it is reasonable to use split times that are in the order of an orbit period but that are more generally aligned with an extrema.

Figure 8:
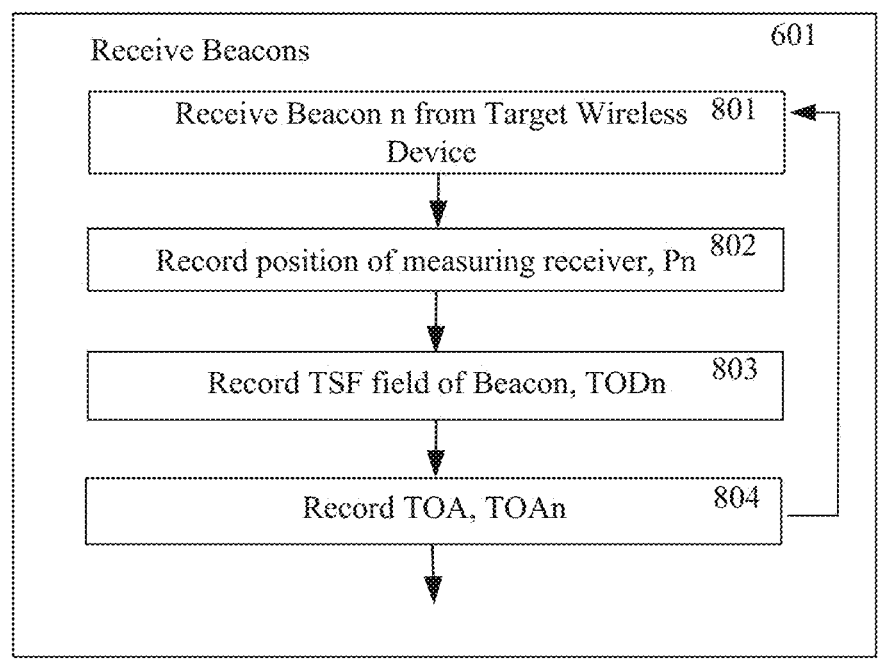
FIG. 8 is an example flowchart for receiving beacons from a wireless device by a wireless measuring station, in accordance with some embodiments.

FIG. 8 is an example flow diagram of step 601 shown in FIG. 6 for receiving beacons from the wireless device 120 by the wireless measuring station 110. At step 801 a beacon is received. By way of example, the beacon can be received via antenna 780 and demodulated in wireless receiver 710. At step 802 the position, Pn, of the wireless measuring station 110 is recorded. The position co-ordinates may be provided by GPS 720 and/or gyro 760 and recorded in processing circuitry 716 and/or processing circuitry 735. At step 803 the value of the TSF field, TODn, in the received beacon is recorded. The TSF field in the received beacon may be demodulated and decoded in the wireless receiver 710. At step 804, the time that the beacon was received is recorded at the wireless measuring station 110. The recorded reception time, TOAn, may be read from timer/clock 719.

Figure 9:
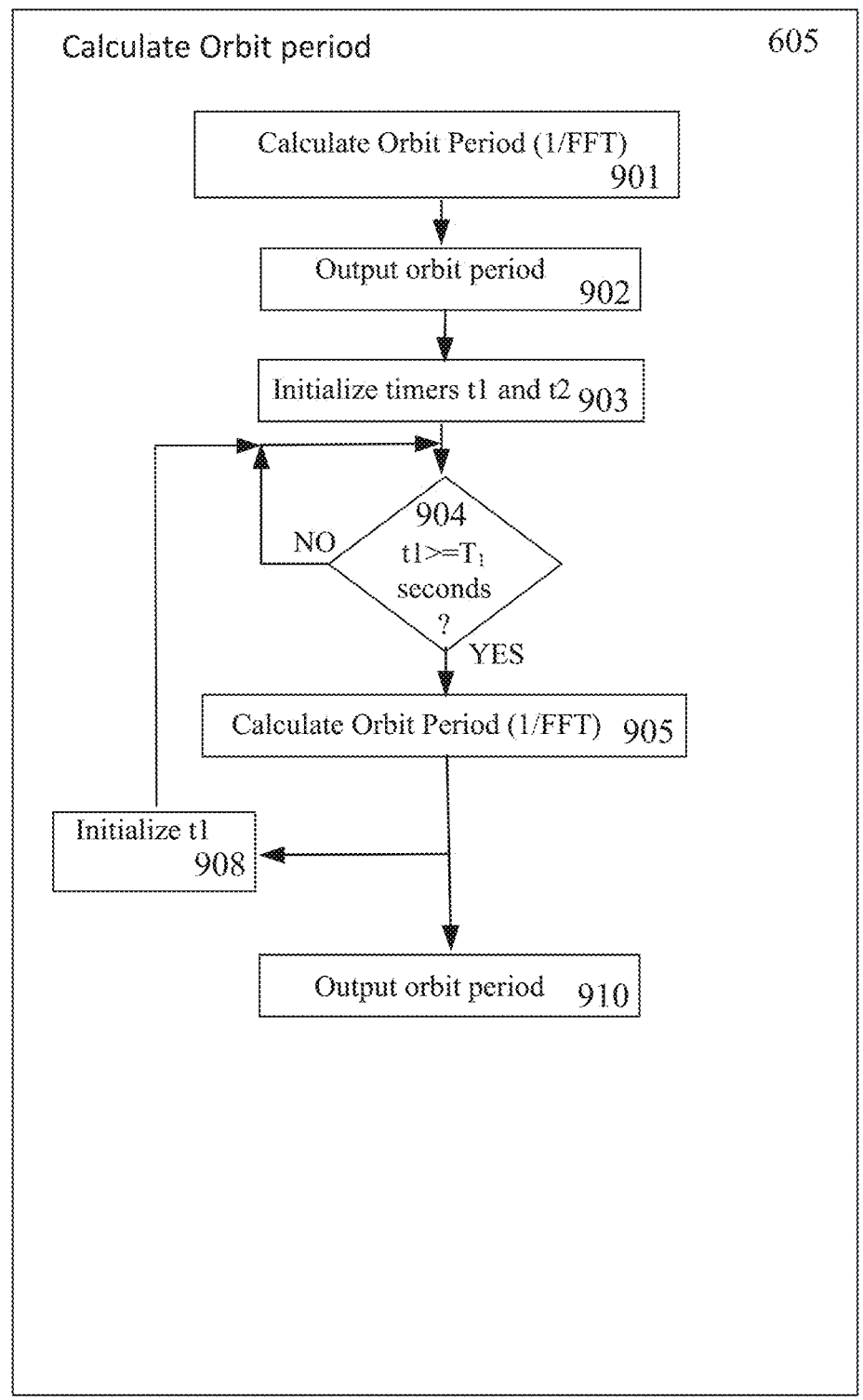
FIG. 9 is an example flowchart describing a calculation process of an orbit period, in accordance with some embodiments.
Figure 10:
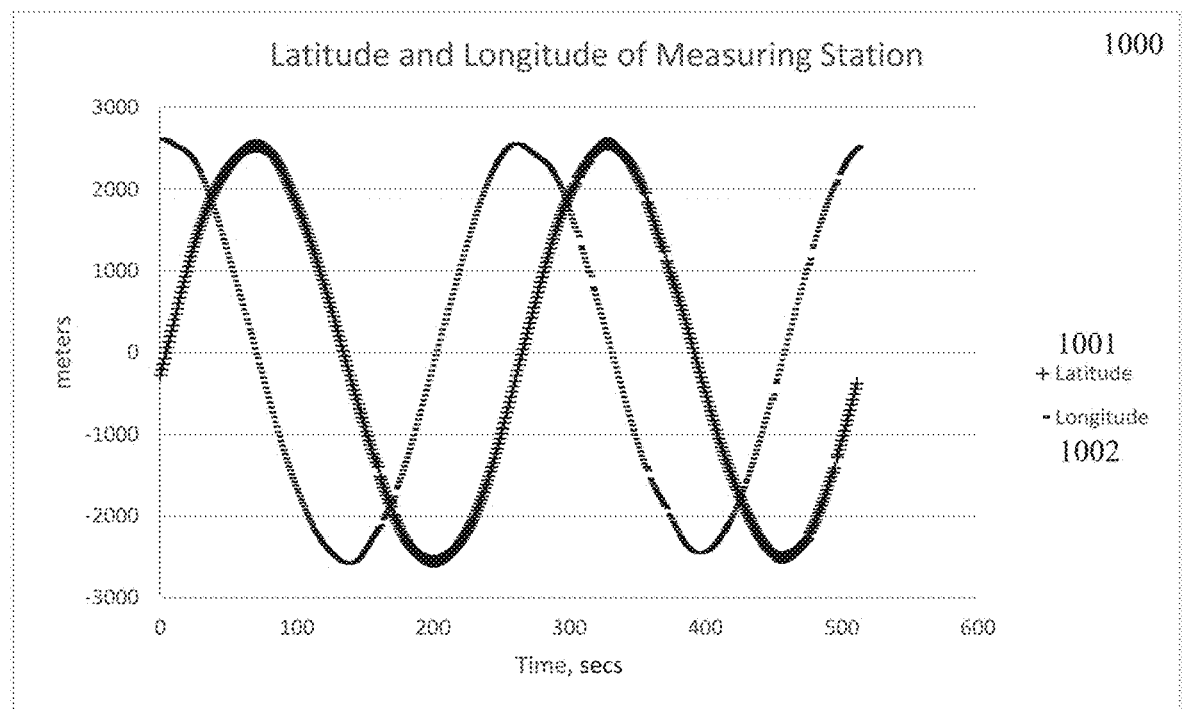
FIG. 10 is an example graph of latitude and longitude readings of a wireless measuring station as it completes orbits, in accordance with some embodiments.
Figure 11:
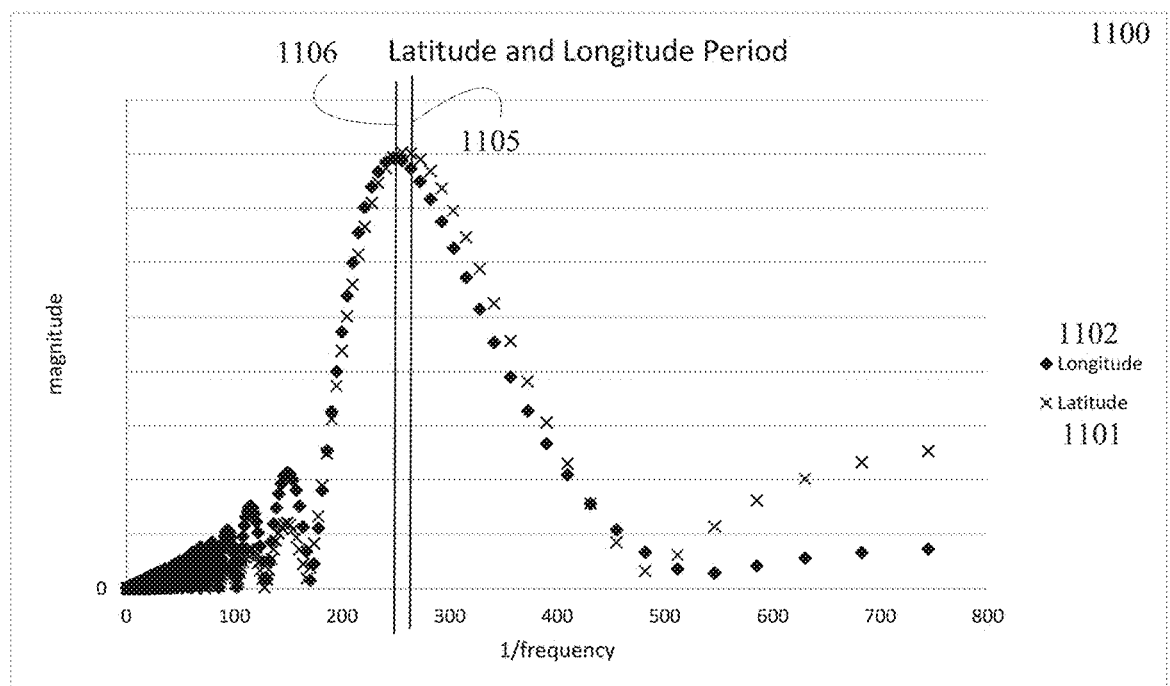
FIG. 11 is a graph depicting magnitude values for Latitude and Longitude as a function of 1/frequency, in accordance with some embodiments.

FIG. 9 is an example flow diagram of step 605 shown in FIG. 6 where the orbit period is calculated. Orbit period may be simply estimated using the positional information of the wireless measuring station 110 obtained from GPS 720 and time. A more accurate method involves providing orbit time at regular intervals, $T_1$, after two complete orbits. At step 901, at least 2 orbits having been completed (see FIG. 6, step 603), the orbit period is calculated from the latitude and longitude positions of the wireless measuring station 110 that are stored as discussed above with reference to FIG. 6 at step 601. According to the method disclosed herein, calculating the orbit period includes performing a fast Fourier transform (FFT) on the latitude and longitude of the wireless measuring station 110, which are continuously being recorded as discussed above with reference to step 601, and then calculating the orbit period as the inverse of the frequency. FIG. 10 is an example graph 1000 of the latitude 1001 and longitude 1002 readings of the wireless measuring station 110 as it completes orbits 400 shown in FIG. 4. FIG. 11 is generated by first performing an FFT on the latitude and longitude to convert them to frequency, and then plotting in graph 1100 their magnitude as a function of 1/frequency, i.e., period, of latitude 1101 and longitude 1102. The value of 1/frequency at the peak values of latitude 1101 and longitude 1102 represents the latitude orbit period 1105 and longitude orbit period 1106, respectively. The orbit period may then be determined as the average of the two readings. In the example depicted in FIGS. 10 and 11, the latitude orbit period 1105 is 264 seconds, and the longitude orbit period 1106 is 256 seconds (to the nearest second). The average and hence the orbit period may then be set to the average, i.e., 260 seconds. In this example, the latitude 1101 and longitude 1102 is recorded at 1 second intervals and the FFT uses the last 512 seconds of recordings.

At step 902, the orbit period calculated in step 901 is outputted, stored and used in the subsequent calculations. At step 903, timers t1 and t2 are initialized. At step 904, it is checked whether the timer t1 is equal or greater than a preset time $T_1$. When true, at step 905, the orbit period is again calculated using the method discussed above with reference to FIGS. 10 and 11. At step 908 timer t1 is again initialized, the orbit period is outputted at step 910, and the process returns to step 904. For example, assuming a value of t1 is 30 seconds and the orbit period is 260 seconds, the process of step 605 will calculate the orbit period every 30 seconds. Further, the positional data is recorded at step 601 every 1 second and the orbit period step 905 is calculated for the last 512 seconds of positional data.

Figure 12:
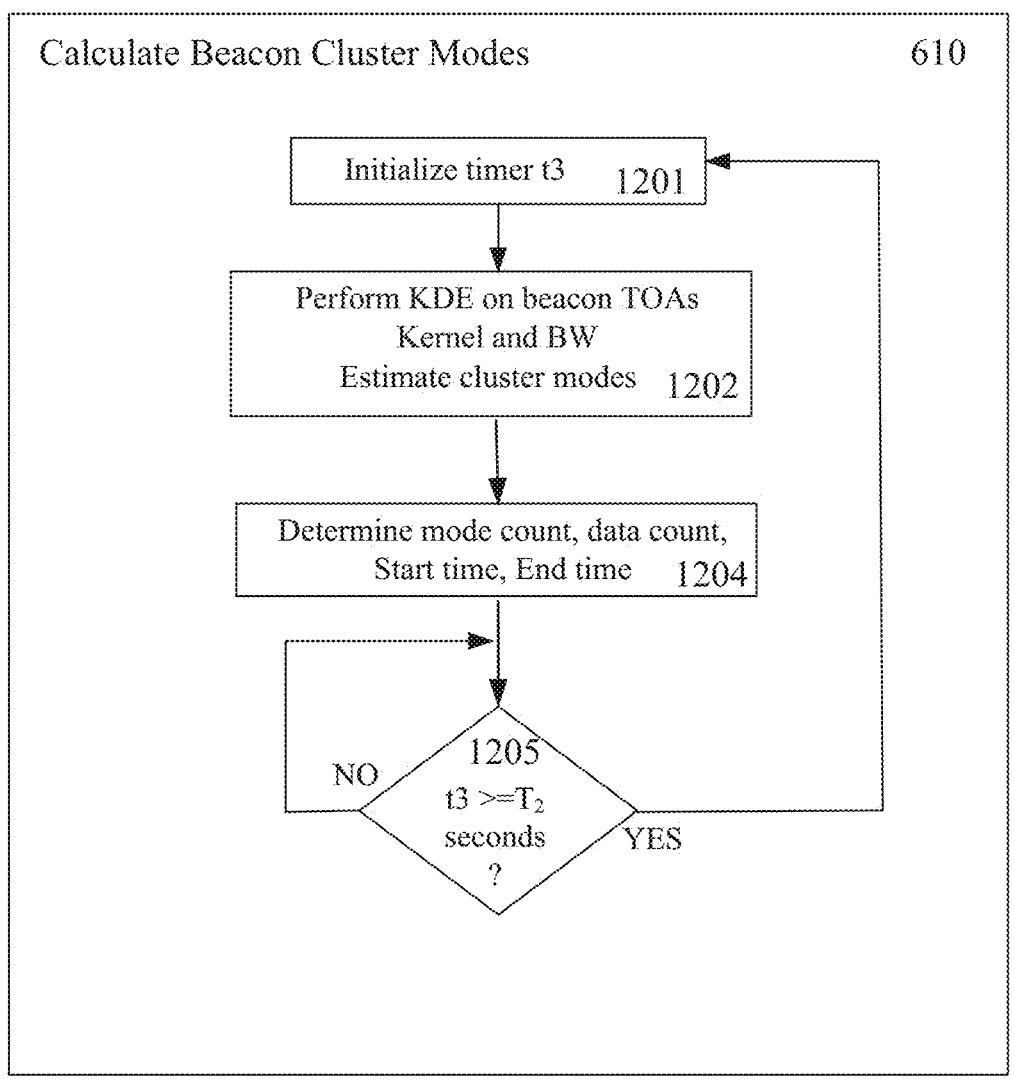
FIG. 12 is an example flowchart for a calculation of beacon cluster modes, in accordance with some embodiments.
Figure 13:
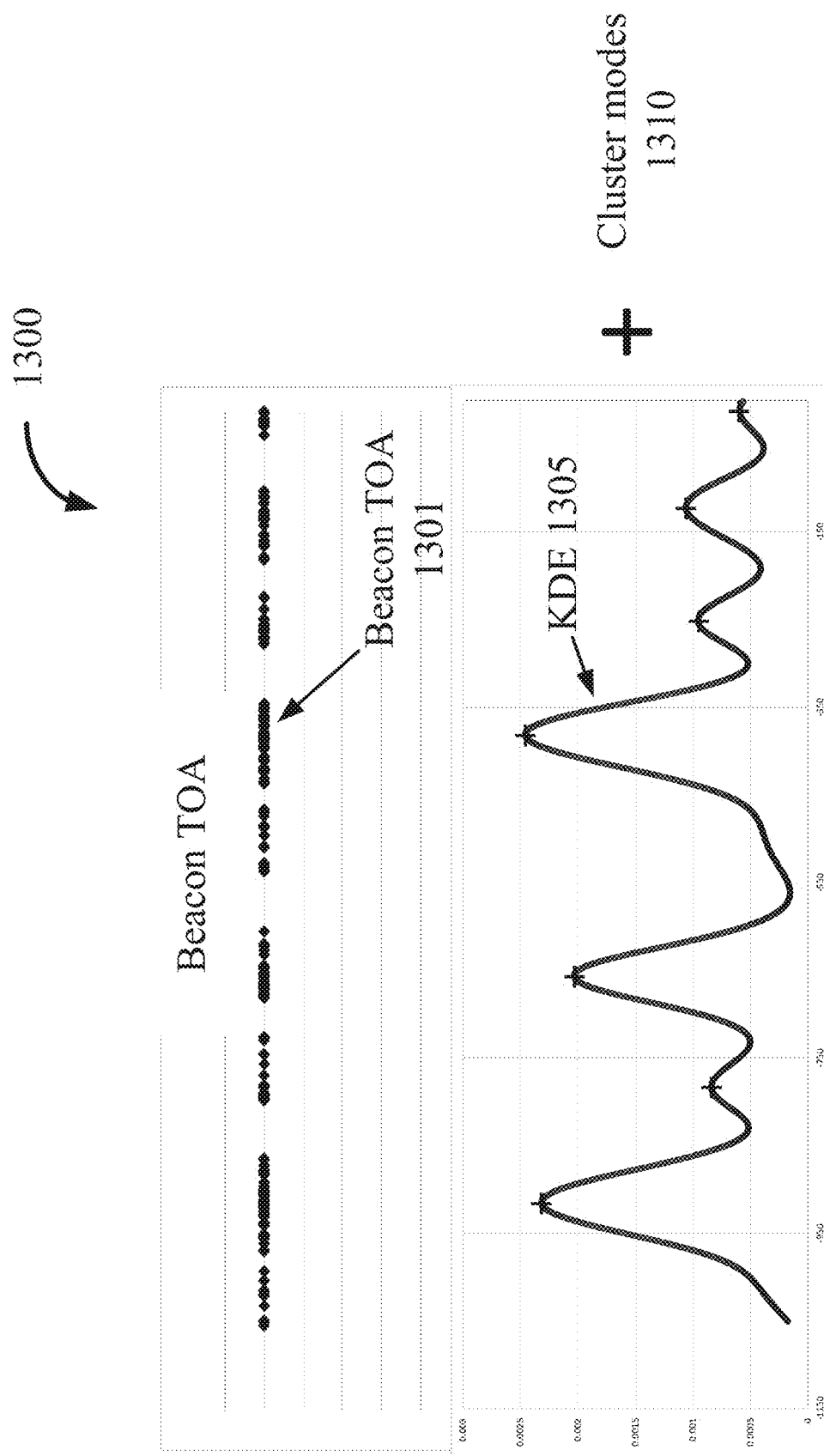
FIG. 13 is example graph showing example beacon TOAs and the corresponding KDE, in accordance with some embodiments.

FIG. 12 is an example flowchart of step 610 shown in FIG. 6 where the beacon cluster modes are calculated. At step 1201 timer t3 is initiated and at step 1202 cluster modes of beacon TOA distribution are calculated using a non-parametric Mean-Shift Clustering Algorithm. KDE may be used with a Gaussian kernel and then data points are shifted using a weighted mean or point of highest density to shift each point until it converges to local mode. So as to yield sufficient granularity in the clusters, the KDE may be a Gaussian kernel with a bandwidth in the order of approximately ⅛ of an orbit. Hence, in one example, a Gaussian kernel with a bandwidth of 30 seconds may be used. At step 1204, the mode count, data count, start time and end time of each cluster is determined. At step 1205 it is checked if timer t3 is equal to or greater than a preset values $T_2$ and if so, the process returns to step 1201. In other words, if, for example, $T_2$ is set to 5 seconds, then every 5 seconds the cluster modes are calculated on the received beacon TOAs and the data count start and end times for each cluster determined. FIG. 13 is example graph 1300 showing example beacon TOAs 1301 and the corresponding KDE 1305. In this example, there are 7 corresponding cluster modes 1310 at times (to the nearest second) −916, −784, −658, −382, −252, −123, and −12. Methods using non-parametric mean-shift clustering algorithms, such as KDE, to calculate the modes of a given distribution are known.

For each cluster mode, in step 1204, a list is prepared of data count, start time and end time. If a mode is detected, then the data count includes all the time data points within the KDE bandwidth of the mode. For example, if the KDE bandwidth is 30 seconds, then all data points within mode time ±30 seconds are part of that cluster. The number of data points in the cluster is the 'data count', the 'start time' is the time of the first data point in the cluster, and the 'end time' is the time of the last data point in the cluster. In the example depicted in FIG. 13, the cluster modes, data count, start and end times of the clusters are as shown in Table 1.

TABLE 1

| Example clusters | | | |
|---|---|---|---|
| Cluster Modes secs | data count | start time | end time |
| −916 | 76 | −937 | −887 |
| −784 | 28 | −793 | −764 |
| −658 | 72 | −675 | −637 |

TABLE 1-continued

| Example clusters | | | |
|---|---|---|---|
| Cluster Modes secs | data count | start time | end time |
| −382 | 87 | −412 | −353 |
| −252 | 34 | −267 | −227 |
| −123 | 36 | −150 | −97 |
| −12 | 21 | −27 | 0 |

Figure 14:
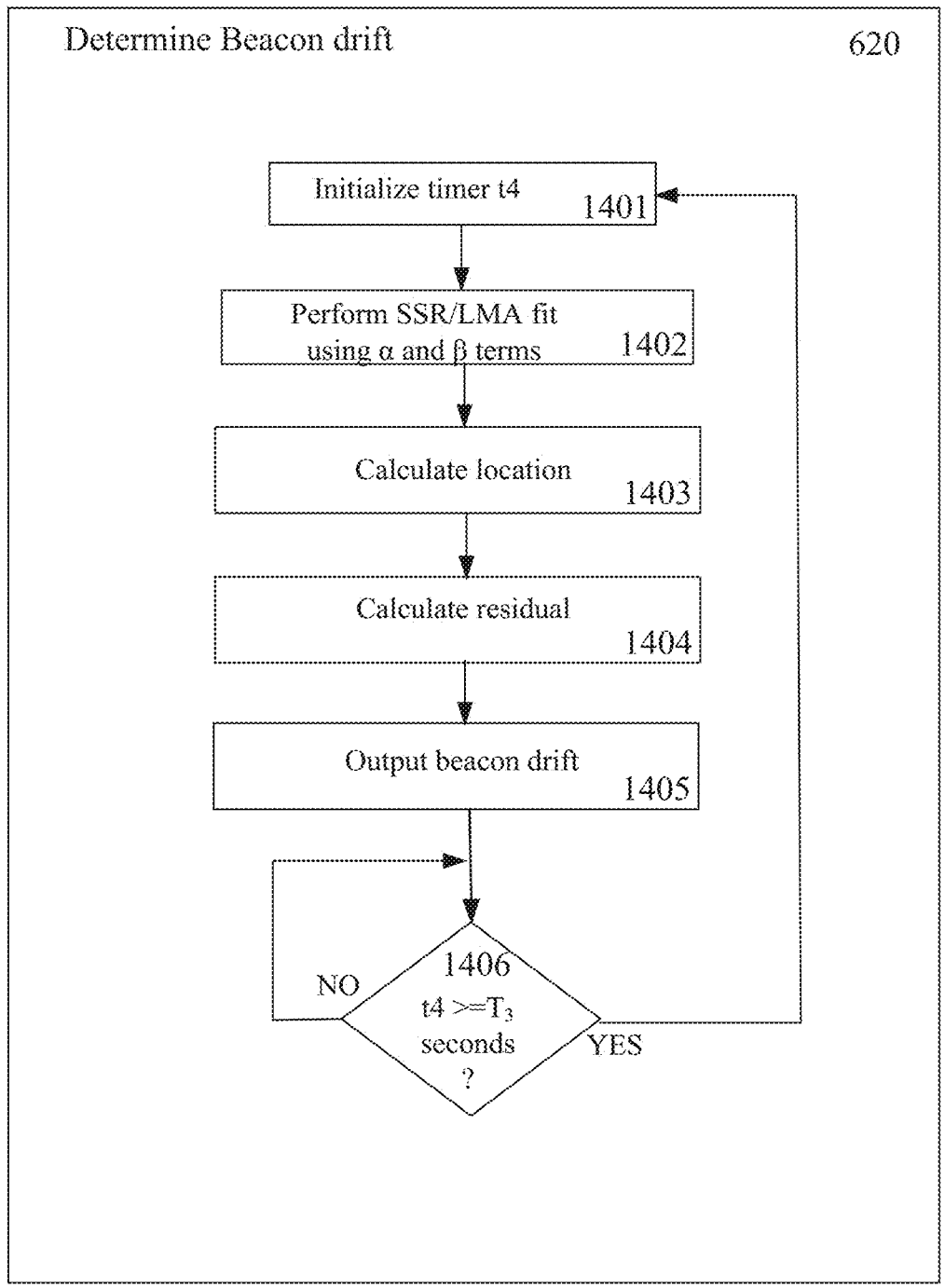
FIG. 14 is an example flowchart where beacon drift is determined, in accordance with some embodiments.
Figure 15:
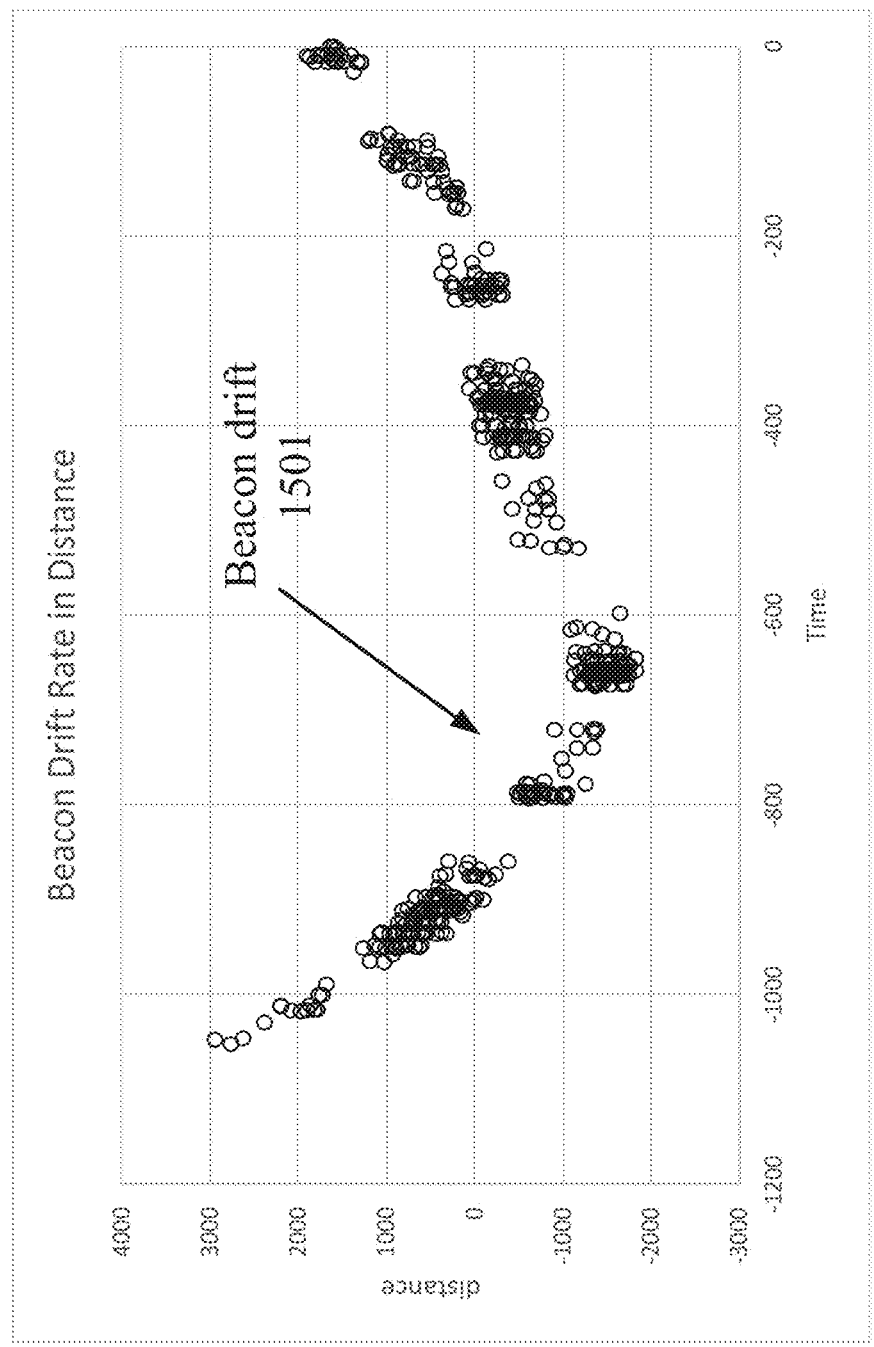
FIG. 15 is an example graph of the beacon drift, expressed in terms of distance, for the same example that is depicted in FIG. 13, in accordance with some embodiments.

FIG. 14 is an example flowchart of step 620 where the beacon drift is determined. At step 1401, timer t4 is initialized. At step 1402, the best fit location of wireless device 110 is calculated, but only using terms α and β, i.e., the offset and the linear drift. The calculation of best fit of TOD and TOA using methods such as SSR and LMA are known. In step 1403, the location of wireless device 120 is estimated based upon the best fit terms derived in step 1402. Steps 1402 and 1403 may be performed by processing circuitry 735 (shown in FIG. 7) and may take place concurrently using the TOD and TOA data stored, for example, in database 734. In step 1404 the residual is calculated. First, based upon the location of the wireless device 120 calculated in step 1403 for each beacon reception, the distance between the wireless measuring station 110 and the wireless device 120 is determined and may be converted to time expressed as distance over the speed of light (i.e., distance/c). The difference between this 'determined' time and the calculated TOF corresponds to the residual. This residual may be expressed in terms of time or distance. At step 1405, the residual, which is expressed in terms of distance, is outputted as the "beacon drift". At step 1406 it is checked whether timer t4 is equal or greater than a preset time T3, and if it is, the process returns to step 1401. An example value for T3 is 5 seconds. This means that the beacon drift can be updated every 5 seconds. FIG. 15 is an example graph 1500 of the beacon drift 1501 expressed in terms of distance for the same example depicted in FIG. 13.

Figure 16:
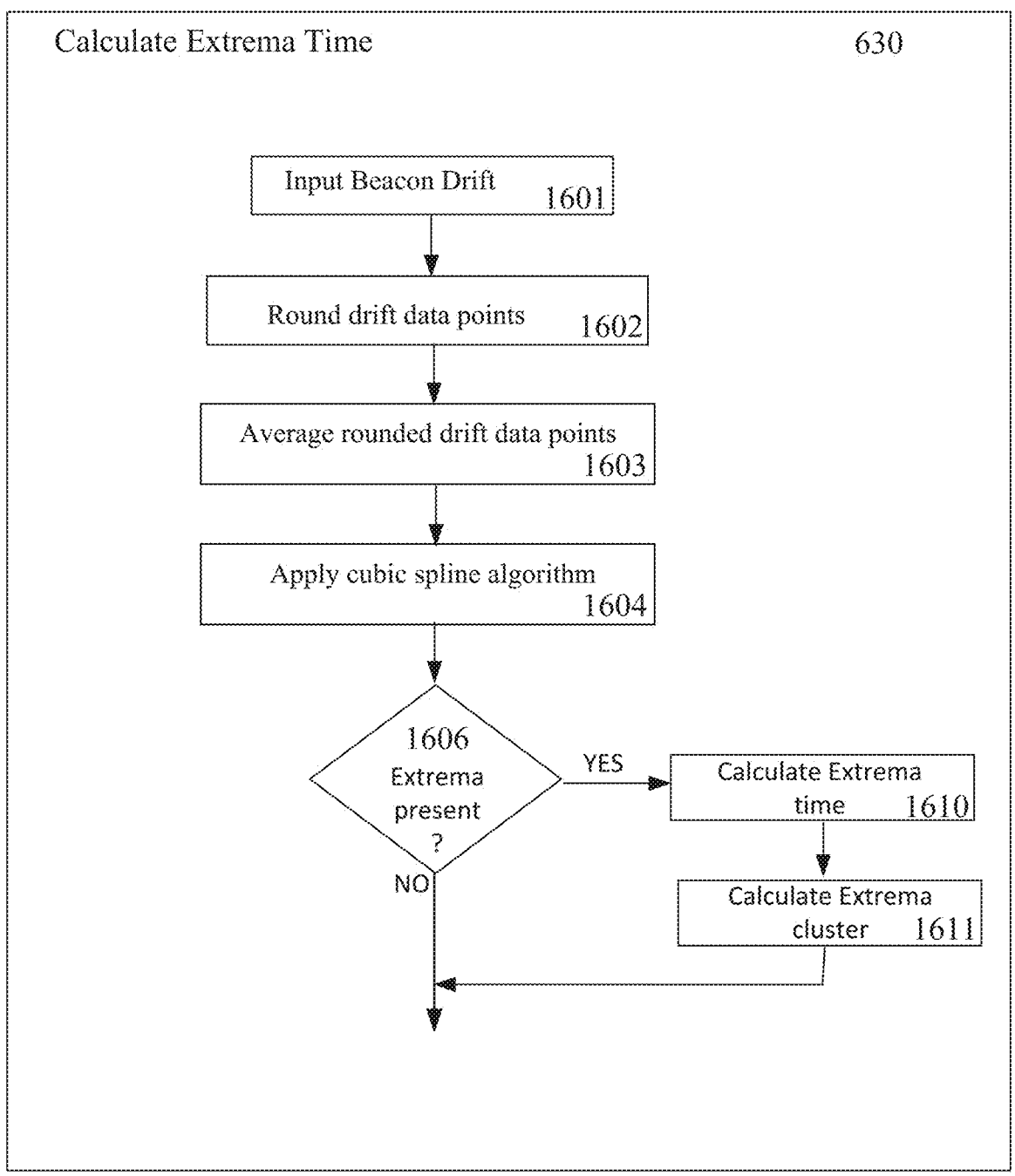
FIG. 16 is an example flowchart of the calculation of extrema time, in accordance with some embodiments.
Figure 17:
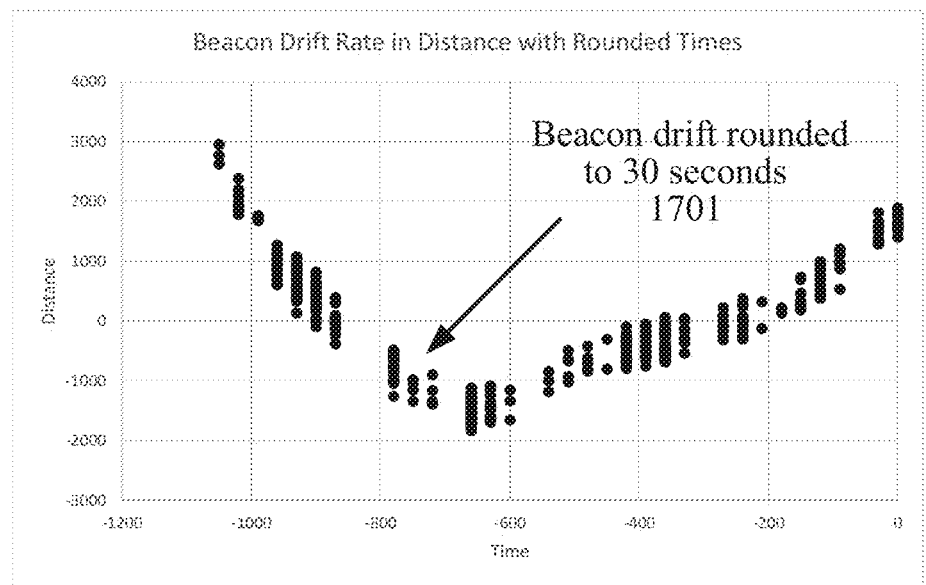
FIG. 17 is an example graph of a rounded beacon drift based upon the beacon drift depicted in FIG. 15, using a time slot of 30 seconds, in accordance with some embodiments.
Figure 18:
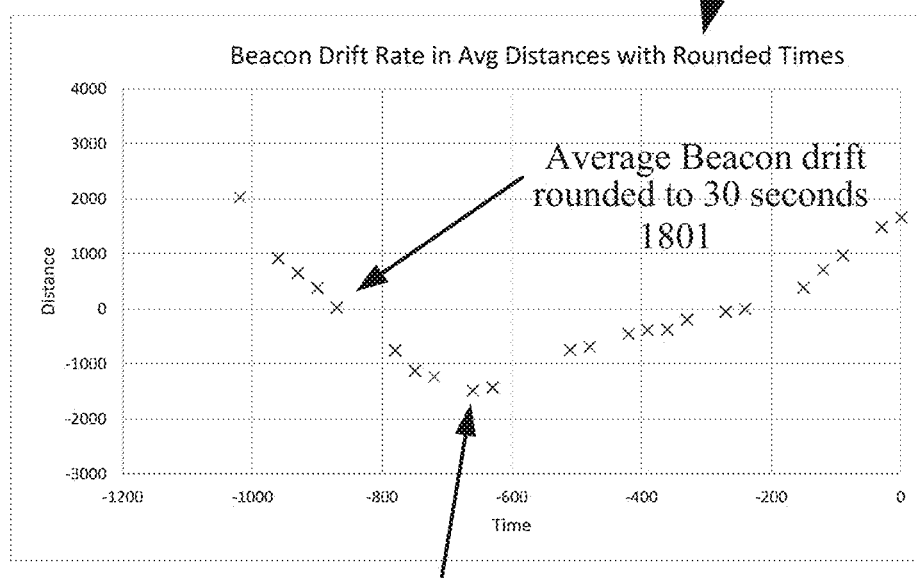
FIG. 18 is an example graph of an averaged rounded beacon drift, in accordance with some embodiments.

FIG. 16 is an example flowchart of step 630 for the calculation of extrema time. At step 1601, the beacon drift is inputted from step 1405. The beacon drift information is discussed above with reference to FIG. 14 and is depicted in example FIG. 15. At step 1602, the time of each beacon drift data point is rounded into time slots. For example, time slots of 30 seconds may be used. FIG. 17 is an example graph 1700 of the rounded times for the beacon drift data points 1701 based upon the beacon drift 1501 depicted in graph 1500 of FIG. 15 using a time slot of 30 seconds. At step 1603, if there are greater than M values in a slot, then the average value of the rounded beacon drift points is determined. For example, if M equals 3 (i.e., M=3), an average value is entered only if there are more than 3 values in the slot. FIG. 18 is an example graph 1800 of the averaged rounded beacon drift 1801 based upon the data from FIG. 17. In step 1604, the curve joining the average rounded beacon drift points is determined. It is note that herein a cubic spline interpolation is used. However, this is not limiting and other interpolation curve fitting schemes may also be used and are within the spirit and the scope of this disclosure. The cubic spline interpolation algorithm calculates the offset, slope, curvature, and cubic coefficient values for each spline or segment connecting and passing through each of the data points. By utilizing these coefficients to generate a curve of evenly spaced values in time, an accurate fitting of the original data can be achieved. The net curvature of the fit provides the shape of the distribution. The cubic spline curve interpolation can determine if the graph has an extrema (i.e., a concavity), and can further determine the net curvature (i.e., whether the concavity is up or down). At step 1606, step 630 confirms whether an extrema is present. If concavity is detected, then at step 1610 the extrema time can be determined by taking either the maximum or minimum value according to the net curvature. In the example depicted in FIG. 18, the concavity direction of graph 1801 is up and hence the minimum value 1802 is the extrema point. The extrema is the minimum or maximum of the curve that is derived by the interpolation process.

At step 1611 an extrema cluster is created based upon the beacon clusters as discussed above with reference to FIG. 12. The average beacon cluster time span is first calculated. As discussed above with reference to step 1204 in FIG. 12, for each beacon cluster the start and end times are determined. The beacon cluster time span is defined as the difference between the end time and the start time (i.e., end time-start time). To calculate the extrema cluster for a number of orbits equal to B, it is determined whether the number of clusters is greater than B+1. When the number of clusters is greater than B+1, the B+1 clusters with the lowest number of data points are used to calculate the extrema cluster. This is to reduce the number of the extrema cluster. The average beacon cluster time span is defined as the sum of the B+1 beacon cluster time spans divided by B+1. An extrema cluster is then created that has a time span equal to the average beacon cluster time span and is centered at the extrema time. Hence, if the beacon cluster mode count is Cb, the data points in cluster i is Ni, the start time of beacon cluster i is StartTime i, the end time of beacon cluster i is EndTime i, and the extrema time is Text, then the average time span, Tsp ave, can be expressed by equation (1):

$$Tsp\ ave = \frac{1}{B+1}\sum_{i=1}^{B+1}(EndTime\ i - StartTime\ i). \quad (1)$$

The extrema cluster start time being provided by equation (2):

$$\text{extrema cluster start time} = Text - Tsp\ ave/2 \quad (2).$$

The extrema cluster end time being provided by equation (3):

$$\text{extrema cluster end time} = Text + Tsp\ ave/2 \quad (3).$$

The number of data points in the extrema cluster, Next, is then the average number of data points in the B+1 beacon clusters that have the lowest data points according to equation (4):

$$N\ ext = \frac{1}{B+1}\sum_{i=1}^{B+1}Ni. \quad (4)$$

Where $N_1$ to $N_{B+1}$ are the data points in clusters with the least data points.

The beacon cluster modes list is then updated to include the extrema cluster. For example, with reference to the example cluster modes shown in Table 1, which corresponds to four orbits, the extrema cluster is calculated based upon those 5 clusters with the lowest data points, as shown in Table 2 below.

TABLE 2

| Example Clusters with 5 lowest data points | | | |
|---|---|---|---|
| Cluster Modes | data count | start time | end time |
| −916 | 76 | −937 | −887 |
| −784 | 28 | −793 | −764 |
| −252 | 34 | −267 | −227 |
| −123 | 36 | −150 | −97 |
| −12 | 21 | −27 | 0 |

Accordingly, the extrema cluster is as shown in Table 3 below:

TABLE 3

| Example extrema cluster | | | |
|---|---|---|---|
| extrema Cluster Mode | data count | start time | end time |
| −654 | 38 | −672 | −635 |

Figure 19A:
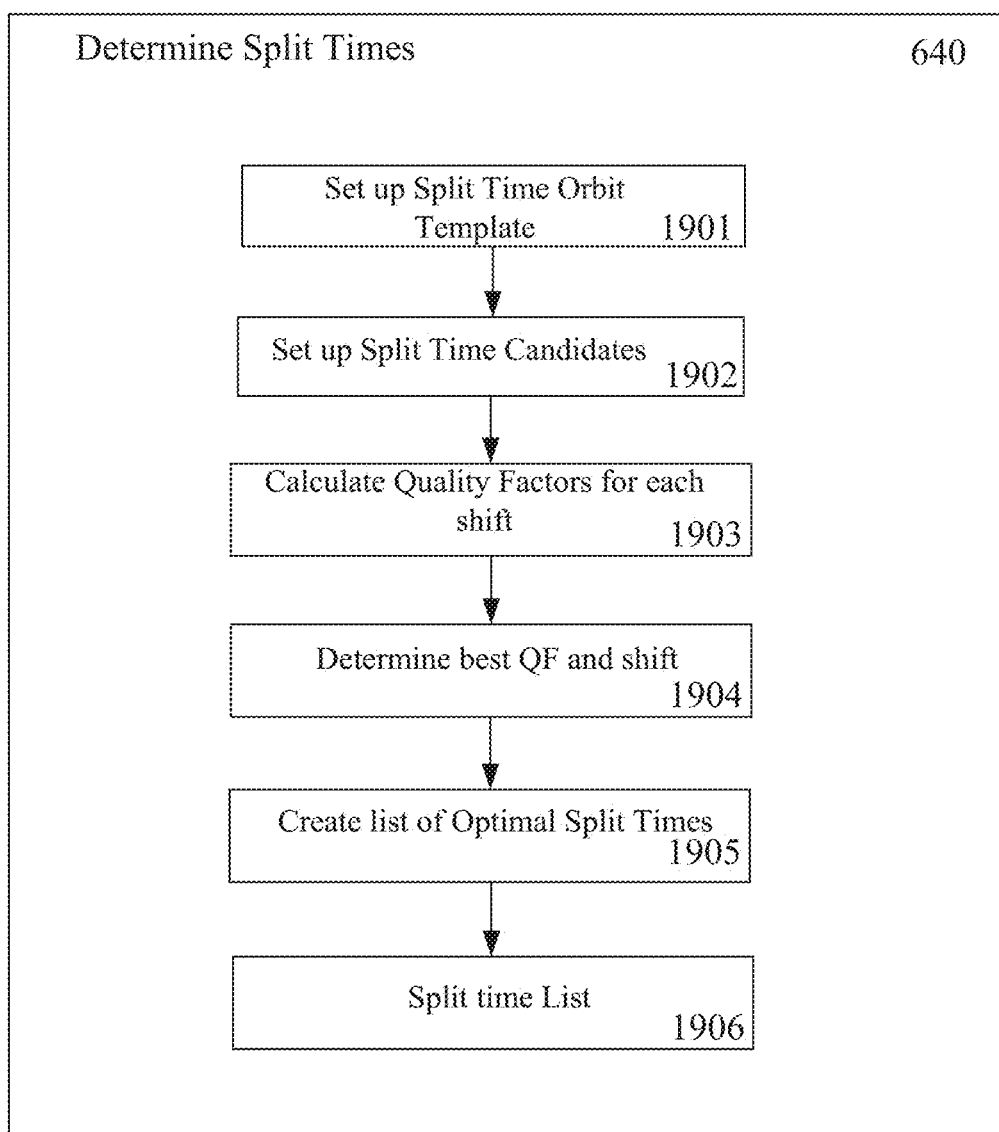
FIG. 19A is an example flowchart where the split times are determined, in accordance with some embodiments.

FIG. 19A is an example flowchart of step 640 where the split times are determined. The basic requirement is to determine optimum split times that will be used to calculate separate location CEPs and merge them. The first and last data points represent the first and last split times, respectively. At step 1901, a split time orbit template is created. This template starts at the time of the first data point and then each split time is separated by one orbit period. The orbit period is calculated as discussed above with reference to FIGS. 9, 10, and 11. For example, the orbits depicted in FIG. 10, which correspond to the beacon TOA measurement example depicted in FIGS. 13 and 15, have an orbit period of 260 seconds. The first data point is at time −1050 seconds, which means that the split time template can include the times −790, −530, −270 and −10. In step 1902 split time candidates are prepared. Each split time candidate is the split time template is shifted by 5 seconds from −15 seconds to 255 seconds. As a result, in this instance, there are 55 split time candidates. In step 1903, a quality factor QF is calculated for each of the 55 split time candidates against the clusters. The QF; is calculated for each candidate in the shift, as follows.

For each of the times in the split time candidate, the nearest cluster mode is first determined as follows. For Split time candidate i and Cluster Mode m, the closest mode is provided by equation (5) when m ranges from 1 to M (i.e., for m=1 to M):

$$Mode_{nearest} = MIN(ABS(SplitTime_{candidate\ i} - Mode_m)) \quad (5).$$

The quality factor, $QF_i$, for split time candidate i, is then calculated via equation (6):

$$QF_i = N_c \frac{(SplitTime_{candidate\ i} - time_{start})(time_{end} - SplitTime_{candidate\ i})}{ABS(SplitTime_{candidate\ i} - mode_{nearest}) + \left(\frac{time_{end} - time_{start}}{2}\right)}. \quad (6)$$

Where $N_c$ is the number of the data points in the nearest cluster (cluster m), and $time_{start}$ and $time_{end}$ are the start time and end times of the nearest cluster, $mode_{nearest}$ (the times as discussed above with reference to FIG. 12, step 1204) is the time of the nearest cluster mode (as discussed above with reference to FIG. 13).

The QF for the complete split time candidate is then calculated via equation (7):

$$QF_{candidate} = \sum_{i=0}^{n-1} QF_i. \quad (7)$$

Where n is the number of split times in the candidate.

At step 1904 the maximum QF and time shift is determined, which corresponds to the maximum QF. At step 1905 the list of optimal split times is created. The optimal split times are the difference between the split time template and the time shift of the best candidate, i.e., Optimal SplitTime=split time$_{template}$−time shift$_{best\ candidate}$ (8).

Figure 19B:
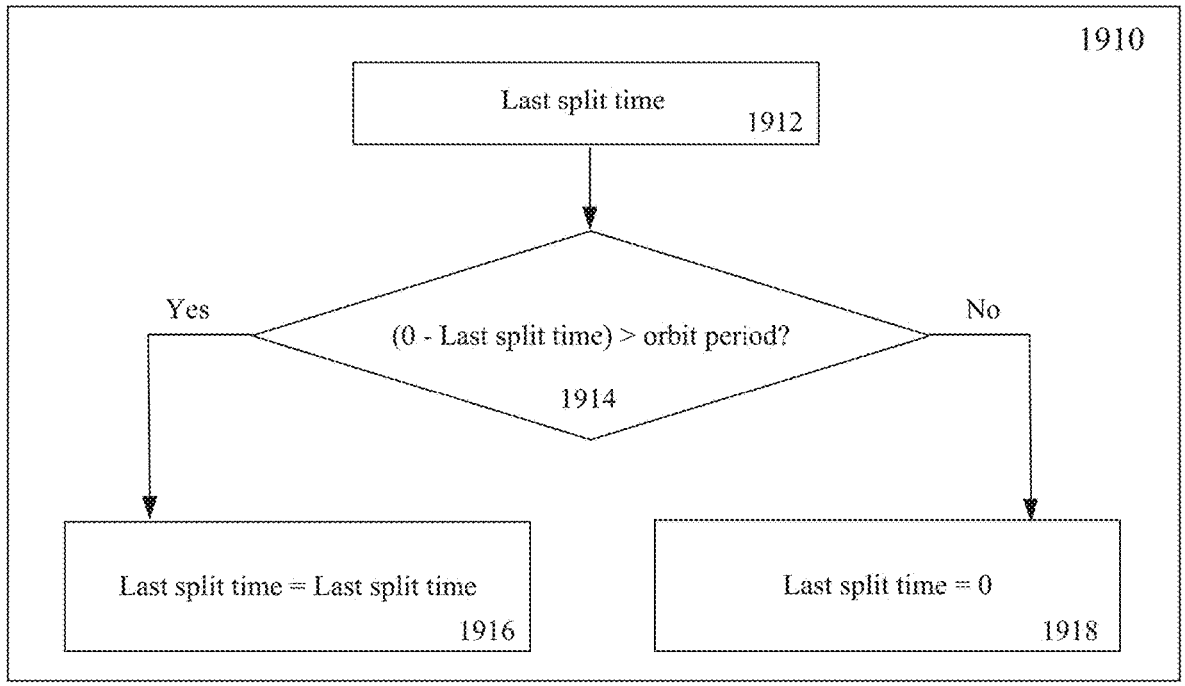
FIG. 19B is an example flowchart for a process of checking a last split time in a list of optimal split times, in accordance with some embodiments.

At step 1906, the best split time list is determined. The last split time is set to time zero (the latest time) and split time zero is set to the oldest time. A check is made whether the last split time is not closer than an orbit period to time zero. If it is, the last data point is eliminated. FIG. 19B illustrates an example process 1910 for checking the last split time. At step 1912, the last split time is received. At step 1914, a check is made whether the difference between zero and the last split time is greater than the orbit period (i.e., whether (0−last split time)>orbit period). If so, at step 1916, the last split time is set to the value of the last split time in the list of optimal split times (i.e., last split time=last split time). Otherwise, at step 1918, the last split time is set to zero (i.e., last split time=0).

Figure 19C:
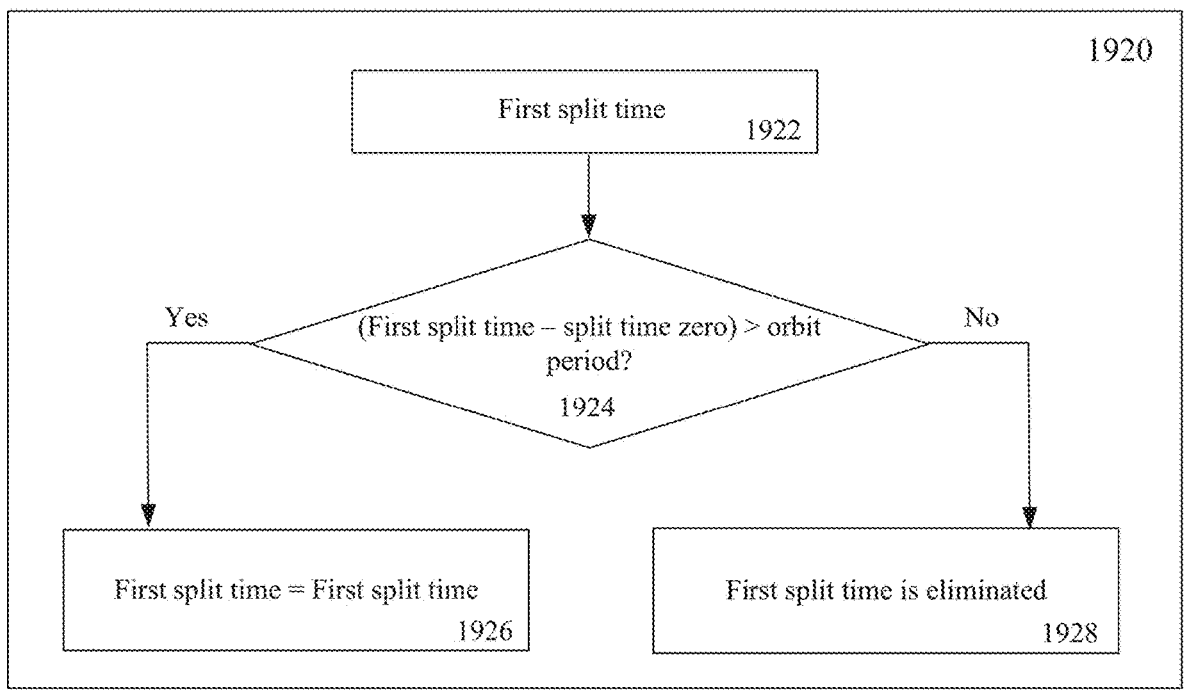
FIG. 19C is an example flowchart for a process of checking a first split time in the list of optimal split times, in accordance with some embodiments.

Then a check is made that the first split time is at least an orbit period from split time zero. FIG. 19C illustrates an example process 1920 for checking the first split time. At step 1922, the first split time is received. At step 1924, a check is made whether the difference between the first split time and the split time zero is greater than the orbit period (i.e., whether (first split time −split time zero)>orbit period). If so, at step 1926, the first split time is set to the value of the first split time in the list of optimal split times. Otherwise, at step 1928, the first split time is eliminated from the list of optimal split times.

Figure 20:
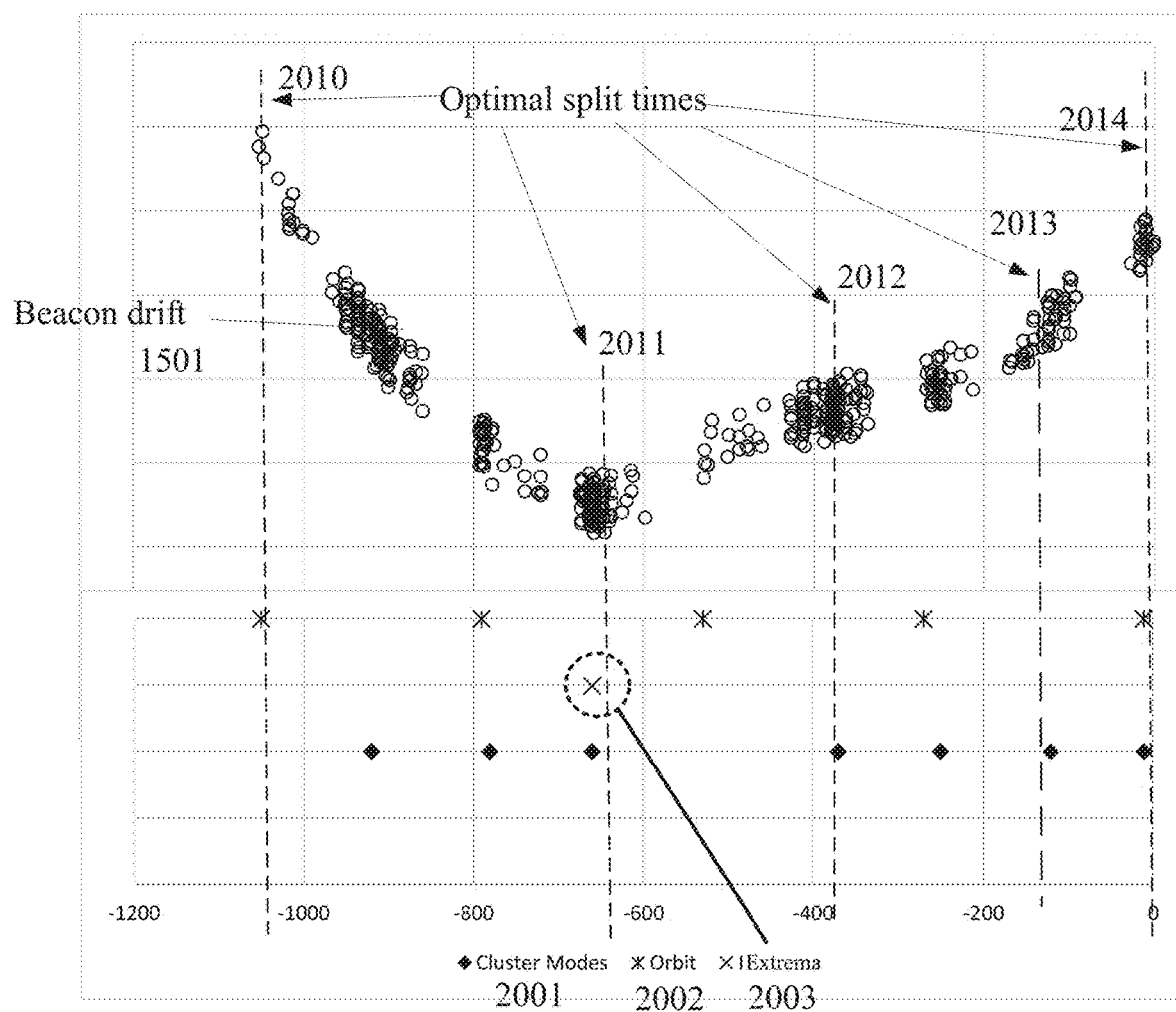
FIG. 20 depicts an example of beacon drift, cluster modes, orbits, and extrema, in accordance with some embodiments.

FIG. 20 depicts the example beacon drift 1501, the cluster modes 2001, the orbits 2002, and the extrema 2003. Table 4 is the list of orbit times and cluster modes. It may be noted that cluster mode at −654 seconds is the extrema cluster.

TABLE 4

Example Orbit and cluster modes

| Orbits | Cluster Modes | data count | start time | end time |
|---|---|---|---|---|
| −1050 | −916 | 76 | −937 | −887 |
| −790 | −784 | 28 | −793 | −764 |
| −530 | −658 | 72 | −675 | −637 |
| −270 | −654 | 38 | −672 | −635 |
| −10 | −382 | 87 | −412 | −353 |
|  | −252 | 34 | −267 | −227 |
|  | −123 | 36 | −150 | −97 |
|  | −12 | 21 | −27 | 0 |

To better understand how the split times are determined according to this disclosure, reference will be now made to the following calculations that use the examples of orbit and cluster modes depicted in Table 4.

With reference again to FIG. 19A, in step 1901, the split time template is the orbits as shown in the first column of Table 4. In step 1902, each split time candidate is the template shifted by 5 seconds from −15 seconds to 255 seconds—hence, in this example, there are 55 split time candidates. In step 1903, a quality factor QF is calculated for each of the 55 split time candidates. For example, for a time shift of 50 seconds, the corresponding time shift candidate is −740, −480, −220. Referring to Table 4, the closest cluster to split time candidate −740, using equation (5), is the cluster at −784. From equation (6), the QF is calculated as −605. Similarly, the closest cluster to split time candidate −480, using equation (5), is the cluster at −382. From equation (6), the QF is calculated as −5880, and the closest cluster to split time candidate −220, using equation (5), is the cluster at −252. From equation (6), the QF is calculated as −234. The sum, equation (7), is −6720.

Figure 21:
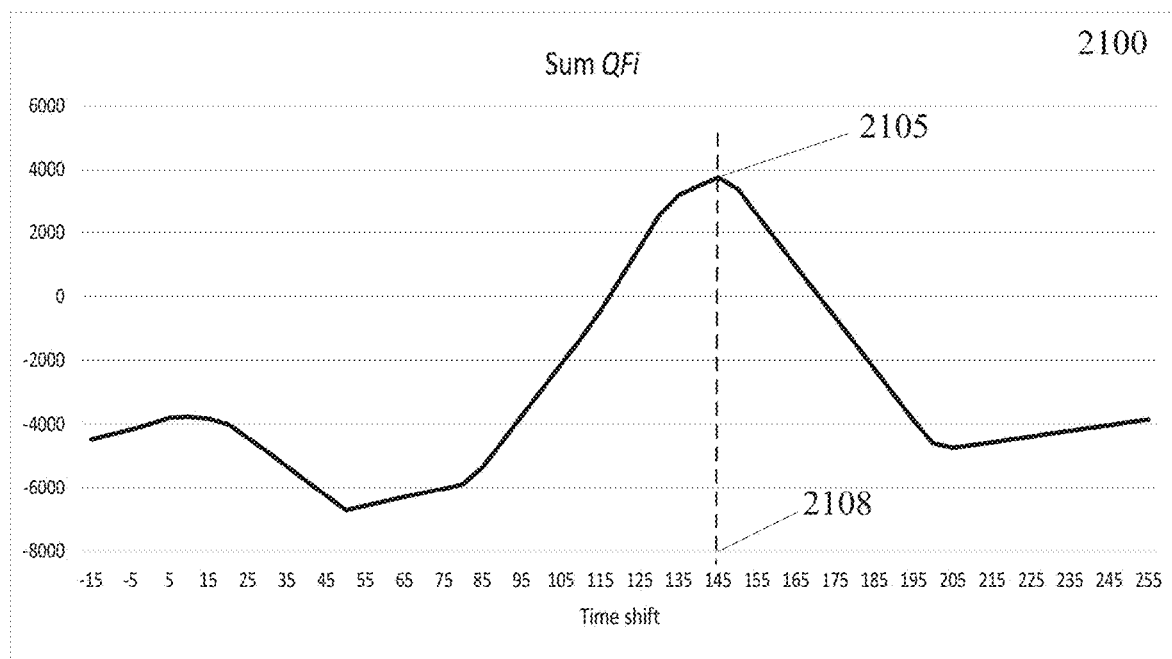
FIG. 21 is a graph of example sums corresponding to a split time candidate, in accordance with some embodiments.

FIG. 21 is a graph 2100 of the example sums, as provided by equation (7), for the split time candidate for time shifts from −15 to +255 seconds. The peak sum QF; 2105 is at time shift 145 seconds, 2108. Hence, the list of optimal split times is the first and last data points plus the split time template, plus 145 seconds, i.e., −1050, −645, −385, −125, 0. These optimal split times, 2010, 2011, 2012, 2013, and 2014 respectively, are depicted in FIG. 20. Because from equation (9) it is deduced that the split time at −125 seconds is less than an orbit (260 seconds) from time 0, it is dropped. From equation (10), the first split time, −645, is more than an orbit from split time zero, −1050 seconds, and hence is valid. Thus, at step 1906, the final split time list is set to −1050, −645, −385, 0.

It is noted that there are other methods of calculating the split times. For example, one method may be to first set the start and end times, and then set any extrema point as a split time followed by a check that no two split times are within an orbit of each other. However, the use of the QF equations (6) and (7), followed by the above checks, ensures that equations (9) and (10) provide optimal split times corresponding to major clusters and extrema point(s). It should be noted that equation (6) may be simplified by omitting the divisor terms. For example, equation (6) may be re-written in the alternative form provided by equation (11):

Alt $QF_i = N_c(\text{SplitTime}_{candidate\ i} - \text{time}_{start})(\text{time}_{end} - \text{SplitTime}_{candidate\ i})$ (11).

Figure 22:
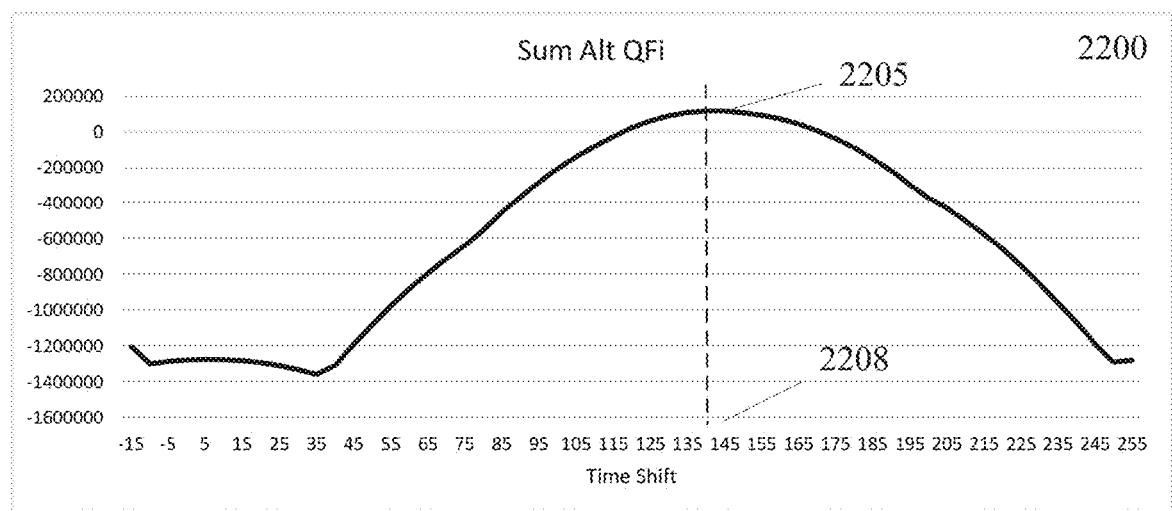
FIG. 22 is a graph of example sums corresponding to a split time candidate, in accordance with some embodiments.

FIG. 22 is a graph 2200 of the example sums, using equations (11) and (7) for the split time candidate for time shifts between −15 and +255 seconds. The peak sum Alt QF; 2205 is at time shift 140 seconds, 2208. Hence, the result is similar to graph 2100 with the exception that graph 2200 is a second order function whereas graph 2100 is a first order function. Thus, the peak in graph 2100 is more pronounced and is therefore preferred.

It may be noted that the second order term γ may be used when CEP ellipse merging takes place, whereas it is generally required when calculating the overall CEP ellipse in order to attempt to correct non-linear changes in the β term. Merging CEP ellipses has the objective of overcoming non-linear changes in β which cannot be corrected by the second order term γ—i.e., an extrema that is not a second order term, but the drift between time splits may include a second order term. The decision to use the merging CEP ellipse method in place of a single set α, β, γ fit, may be determined by using an F Test between the single CEP fit and the merged CEP set. The method of merging CEP ellipses and using an F test is known.

Figure 23:
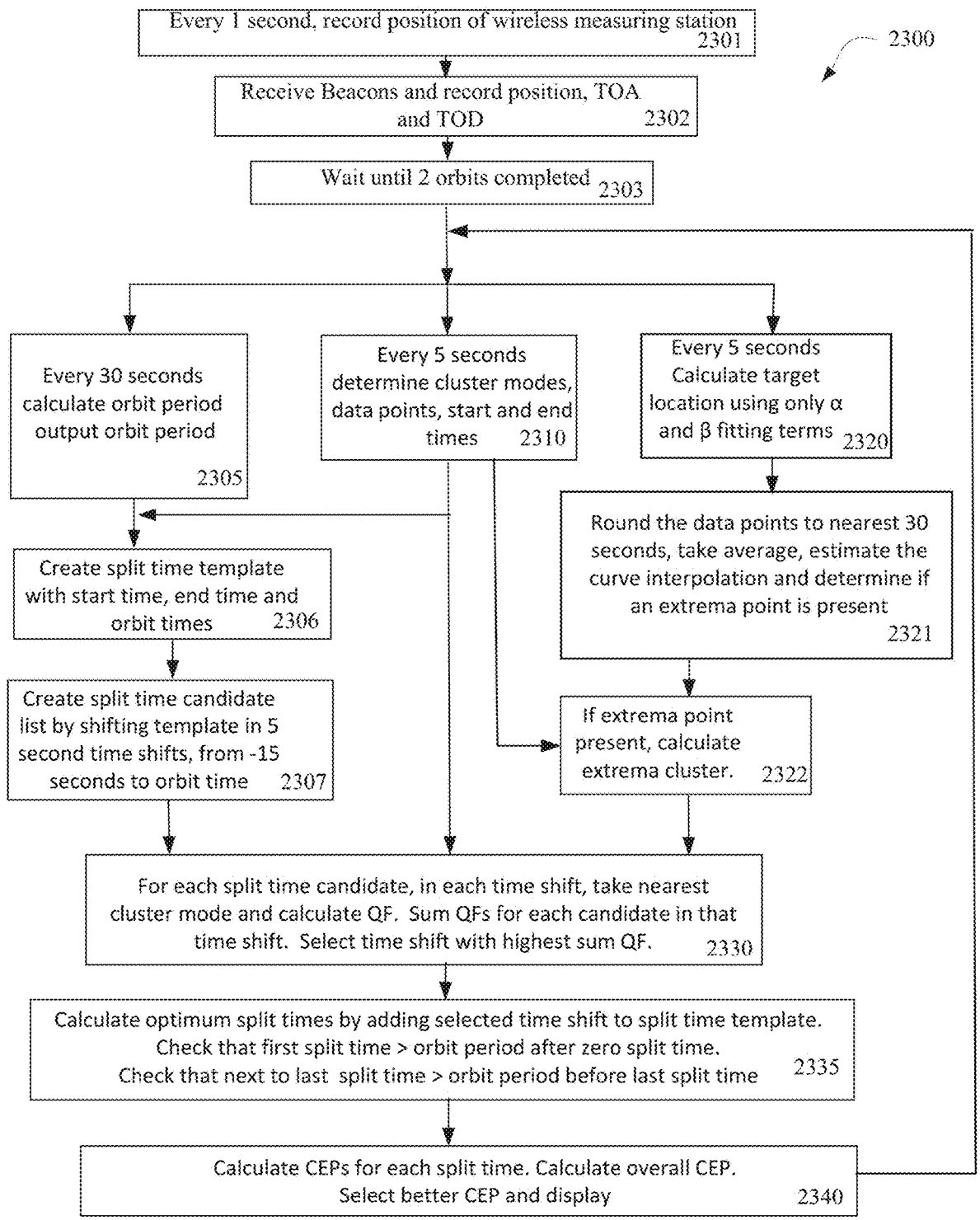
FIG. 23 is an example flowchart of a method describing one implementation of this disclosure where wireless measuring station is orbiting a target wireless device as depicted in FIG. 4, in accordance with some embodiments.

FIG. 23 is an example flowchart of a method 2300 that describes, according to some embodiments, one implementation of this disclosure where wireless measuring station 110 is orbiting a target wireless device 120 (e.g., as depicted in FIG. 4). At step 2301, the position of the wireless measuring station 110 is continuously recorded. For example, the latitude, longitude, altitude, and time are recorded every second. In some examples, step 2301 is performed continuously during the method 2300. For example, the position of the wireless measuring station 110 may be recorded at a periodic interval (e.g., every one second during an orbit of the measuring station 110). The position of the wireless measuring station is recorded by the processing circuitry 716 using information provided by GPS 720 and/or Gyro 760. Additionally, beacons from the wireless device 120 are received by wireless measuring station 110 in step 2302 continuously throughout the orbits. The beacons may be received via antenna 780 on receiver front end 712 and demodulated in baseband 714 shown in FIG. 7. As each beacon is received, the TOD and the TOA is recorded in the processing circuitry 716 and/or the processing circuitry 735. The TOD is the TSF field in the beacon, and the TOA is the time of arrival as recorded at the wireless measuring station 110. The position of the wireless measuring station 110 is also recorded for each beacon reception. At step 2303, the process waits until two orbits have been completed. This wait enables the offset of the two time-clocks to be estimated in step 2320, i.e., the timeclock 709 in the wireless device 120 and the timeclock in the wireless measuring station 110.

As shown in FIG. 23, after step 2303, steps 2305, 2310 and 2320 continue in parallel. In step 2305, the orbit period is determined. Using the positional data of the wireless measuring station 110 recorded in step 2301, the orbit period is calculated as discussed above with reference to FIG. 9. The FFT, as discussed above with reference to FIGS. 10 and 11, is based on the last 512 positional data points, or 512 seconds. The calculations may be carried out in the Processing circuitry 716 and/or processing circuitry 735. The orbit period is outputted immediately and then recalculated every 30 seconds.

At step 2310, every 5 seconds, the cluster modes of the TOAs are determined. As discussed above with reference to FIGS. 12 and 13, the clusters are calculated using a non-parametric mean-shift clustering algorithm, KDE, with a Gaussian kernel of 30 seconds bandwidth such that all data points within a mode time ±30 seconds, are part of that cluster. The number of data points in each cluster is the 'data count', the 'start time' is the time of the first data point in the cluster, and the 'end time' is the time of the last data point in the cluster. The clusters are inputted to step 2306 where a split time template is created as follows:

zero split time=the time of the first recorded beacon data points;

time last split time=time of the last recorded beacon data points;

bth split time=zero split time+b×orbit period.

Because the split time template omits the zero and last split times, an orbit period T(orb) for B completed orbits the split time templates STT may be written as provided by equation (12):

$$\text{Split time template, STT} = T(\text{orb}), 2T(\text{orb}), 3T(\text{orb}), \ldots, BT(\text{orb}) \quad (12).$$

Hence, the STT includes B values, each separated by T(orb), and the bth candidate is bT(orb).

The following calculations and processes may be carried out by the processing circuitry 735.

In step 2307, a split time candidate list is created. The split time candidate list includes the split time template, the time shifted in steps from −15 seconds to T(orb) (to the nearest 5 seconds), i.e., the last time shift, TS(last)={T(orb)−MOD [T(orb)/5]}. For example, if the orbit time T(orb) is 263 seconds, then the last time shift TS(last) is equal to 260 seconds. Hence, split time candidate, STC, for a time shift that is equal to TSm, is provided by equation (13):

$$STCm = T(\text{orb}) + m, 2T(\text{orb}) + m, 3T(\text{orb} + m), \ldots, BT(\text{orb}) + m \quad (13).$$

Where m∈{−15, −10, −5, 0, 5, 10, 15, 20 . . . , TS(last)}.

The split time candidate list is inputted to step 2330.

In step 2320, every 5 seconds, the location of the target wireless device 120 is estimated, using only the first and second order fitting parameters, i.e., the $\alpha$ and $\beta$ terms, offset and linear drift. As discussed above with reference to FIGS. 14 and 15, for each beacon reception, the distance between the wireless measuring station 110 and the wireless device 120 is determined and converted to time, i.e., distance/c, where c is the speed of light. The difference between this 'determined' time and the calculated TOF is the residual, which is then expressed in terms of distance by multiplying with c, the speed of light. The residual, in terms of distance, is outputted to step 2321 as the "beacon drift".

As discussed above with reference to FIGS. 16, 17, and 18, in step 2321, the beacon drift data points are rounded to bins of 30 seconds and the average value of each bin is calculated. The curve joining the rounded beacon drift points is then determined using a cubic spline interpolation. The cubic spline interpolation algorithm generates coefficients for each spline which can be used to generate a curve that fits the beacon drift data distribution. The net curvature of this fit provides concavity information about the data distribution, which may indicate the presence of an extrema point occurring at a minimum or a maximum. Once this is known, the minimum or maximum of the fit curve can be used as the extrema.

In step 2322 an extrema cluster is created, as discussed above with reference to FIG. 16 in step 1611 and equations (1) to (4). The extrema cluster is centered at the extrema time calculated in step 2321, and is effectively the average of the B+1 clusters derived in step 2310 with the lowest data point counts. The extrema cluster time, the number of data points, equation (4), the start and end times, and equations (1), (2) and (3) are then inputted to step 2307.

In step 2330, as discussed above with reference to FIGS. 19A-19C, the optimum split times are calculated. Using the split time candidate list, equation (13) in step 2307, for each 5 second time shift, the closest cluster node (including the extrema cluster mode) to each candidate is first determined and the corresponding quality factor is calculated using equation (6). The quality factor for that time shift is then calculated using equation (7). As discussed above with reference to FIG. 21, the time shift that produces the maximum quality factor value is selected as the 'best candidate' time shift. The best candidate shift time is then added to the shift time template.

In step 2335, the optimum split times are calculated using equation (8), and then a check is made that (i) the first split time is greater than one orbit period after zero split time (as provided by equation (10)), and that (ii) the B T(orb) split time (as provided by equation (12)) is greater than one orbit from the last split time of equation (9). The final optimal split times are then inputted to step 2340.

In step 2340, CEP ellipses are calculated for each split time and merged to produce a merged CEP ellipse. Also, a CEP ellipse is calculated fitting to the TOFs over the entire time. The best of the CEP ellipses is then selected, using an F test, and displayed. The process then repeats and every 5-30 seconds a CEP ellipse is produced. The frequency of CEP ellipse production depends on the number of stations being located (could be in the several hundreds) and on the computing resources.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of more than one measuring receiver, the details of the formulas used calculate the split times, allowable times between split times, the details of the measuring station, the method of measuring the time of arrival, the choice of time elapsed and/or orbits made before calculating individual CEP ellipses and merged CEP ellipse, the criteria for displaying a CEP ellipse. Accordingly, the scope should be determined not by the embodiments illustrated, but by the claims and embodiments.

Some Embodiments

Some embodiments may include any of the following:

A1. A method of determining a location of at least one wireless device includes receiving, at a measuring station, a plurality of beacons transmitted from a wireless device; identifying, for the plurality of beacons, a plurality of Times of Arrival (TOAs), a plurality of Times of Departures (TODs), and a plurality of locations of the measuring station at which the plurality of beacons are received. The method further includes determining, for the plurality of beacons, a plurality of Times of Flight (TOFs) based at least in part on the plurality of TOAs and the plurality of TODs; determining an orbit period of the measuring station based on the plurality of locations; calculating a plurality of split time candidates based on the orbit period; calculating, via a clustering algorithm, a plurality of cluster modes for the plurality of TOAs; and calculating a beacon drift based on a difference between a plurality of estimated distances between the wireless device and the measuring station and a plurality of distances derived from the plurality of TOFs. Additionally, the method includes selecting a plurality of optimal split times based, at least in part, on the plurality of split time candidates, the plurality of cluster modes, and the beacon drift; generating a plurality of circular error probability (CEP) ellipses corresponding to the plurality of optimal split times; merging the plurality of CEP ellipses to produce a merged CEP ellipse; and determining a location of the wireless device based, at least in part, on the merged CEP ellipse.

A2. The method of clause A1 can include any of the following components or features, in any combination. Calculating the plurality of split time candidates includes: (i) creating a split time template (STT) having a plurality of split times corresponding to orbit times of the measuring station; and (ii) shifting the STT, in steps of T seconds, across a time period that covers at least the orbit period of the measuring station to provide the plurality of split time candidates, where each split time candidate includes a plurality of shifted split times. Selecting the plurality of optimal split times based on the plurality of split time candidates, the plurality of cluster modes, and the beacon drift includes: (i) for each split time candidate of the plurality of split time candidates, (a) calculating a quality factor, for each shifted split time of the plurality of shifted split times, based on a nearest cluster mode of the plurality of cluster modes that is closest in time to the shifted split time, and (b) summing the quality factors for the plurality of shifted split times; identifying a best shift time candidate from the plurality of shift time candidates having a maximum summed quality factor; (ii) selecting the plurality of shifted split times of the best shift time candidate as the plurality of optimal split times; and (iii) adding a zero split time and a last recorded beacon split time to the plurality of optimal split times. The quality factor for each shifted split time is defined by:

$$QF = N_c \frac{(SplitTime - \text{time}_{start})(\text{time}_{end} - SplitTime)}{\text{ABS}(SplitTime - \text{mode}_{nearest}) + \left(\frac{\text{time}_{end} - \text{time}_{start}}{2}\right)}$$

where QF is the quality factor, $N_c$ is a number of data points in the nearest cluster mode, SplitTime is the shifted split time, $\text{time}_{start}$ is a start time of the nearest cluster mode, $\text{time}_{end}$ is an end time of the nearest cluster mode, and $\text{mode}_{nearest}$ is a time of the nearest cluster mode determined by the clustering algorithm. The method can further include checking that each of the plurality of shifted split times of the best shift time candidate is greater than one orbit period from the zero split time; in response to determining that a shifted split time of the plurality of shifted split times of the best shift time candidate is less than one orbit period from the zero split time, removing the shifted split time from the plurality of optimal split times; checking that each of the plurality of shifted split times of the best shift time candidate is greater than one orbit period from the last recorded beacon split time; and in response to determining that a shifted split time of the plurality of shifted split times of the best shift time candidate is less than one orbit period from the last recorded beacon split time, removing the shifted split time from the plurality of optimal split times. The method can include calculating the plurality of cluster modes using a non-parametric mean-shift cluster algorithm as the clustering algorithm. The non-parametric mean-shift cluster algorithm can include a kernel density estimation (KDE). The bandwidth of the KDE can be approximately 30 seconds. The method can further include determining whether there is an extrema point in the beacon drift and further selecting the plurality of optimal split times based on the extrema point of the beacon drift. The method can further include in response to determining that there is an extrema point in the beacon drift, calculating an extrema cluster based on the extrema point and adding the extrema cluster to the plurality of cluster modes.

A3. A system for determining a location of at least one wireless device includes at least one memory with computer-executable instructions stored thereon. The computer-executable instructions when executed by one or more processors of the system cause the one or more processors to perform operations that include receiving, at a measuring station, a plurality of beacons transmitted from a wireless device; identifying, for the plurality of beacons, a plurality of Times of Arrival (TOAs), a plurality of Times of Departures (TODs), and a plurality of locations of the measuring station at which the plurality of beacons are received. The operations further include determining, for the plurality of beacons, a plurality of Times of Flight (TOFs) based at least in part on the plurality of TOAs and the plurality of TODs; determining an orbit period of the measuring station based on the plurality of locations; calculating a plurality of split time candidates based on the orbit period; calculating, via a clustering algorithm, a plurality of cluster modes for the plurality of TOAs; and calculating a beacon drift based on a difference between a plurality of estimated distances between the wireless device and the measuring station and a plurality of distances derived from the plurality of TOFs. Additionally, the operations include selecting a plurality of optimal split times based, at least in part, on the plurality of split time candidates, the plurality of cluster modes, and the beacon drift; generating a plurality of circular error probability (CEP) ellipses corresponding to the plurality of optimal split times; merging the plurality of CEP ellipses to produce a merged CEP ellipse; and determining a location of the wireless device based, at least in part, on the merged CEP ellipse.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method of determining a location of at least one wireless device, the method comprising:
   receiving, at a measuring station, a plurality of beacons transmitted from a wireless device;
   identifying, for the plurality of beacons, a plurality of Times of Arrival (TOAs), a plurality of Times of Departures (TODs), and a plurality of locations of the measuring station at which the plurality of beacons are received;
   determining, for the plurality of beacons, a plurality of Times of Flight (TOFs) based at least in part on the plurality of TOAs and the plurality of TODs;
   determining an orbit period of the measuring station based on the plurality of locations;
   calculating a plurality of split time candidates based on the orbit period;
   calculating, via a clustering algorithm, a plurality of cluster modes for the plurality of TOAs;
   calculating a beacon drift based on a difference between a plurality of estimated distances between the wireless device and the measuring station and a plurality of distances derived from the plurality of TOFs;
   selecting a plurality of optimal split times based, at least in part, on the plurality of split time candidates, the plurality of cluster modes, and the beacon drift;
   generating a plurality of circular error probability (CEP) ellipses corresponding to the plurality of optimal split times;
   merging the plurality of CEP ellipses to produce a merged CEP ellipse; and
   determining a location of the wireless device based, at least in part, on the merged CEP ellipse.

2. The method of claim 1, wherein calculating the plurality of split time candidates, comprises:
   creating a split time template (STT) having a plurality of split times corresponding to orbit times of the measuring station; and
   shifting the STT, in steps of T seconds, across a time period that covers at least the orbit period of the measuring station to provide the plurality of split time candidates, wherein each split time candidate includes a plurality of shifted split times.

3. The method of claim 2, wherein selecting the plurality of optimal split times based on the plurality of split time candidates, the plurality of cluster modes, and the beacon drift, comprises:
   for each split time candidate of the plurality of split time candidates:
      calculating a quality factor, for each shifted split time of the plurality of shifted split times, based on a nearest cluster mode of the plurality of cluster modes that is closest in time to the shifted split time; and
      summing the quality factors for the plurality of shifted split times;

identifying a best shift time candidate from the plurality of shift time candidates having a maximum summed quality factor;
selecting the plurality of shifted split times of the best shift time candidate as the plurality of optimal split times; and
adding a zero split time and a last recorded beacon split time to the plurality of optimal split times.

4. The method of claim 3, wherein the quality factor for each shifted split time is defined by:

$$QF = N_c \frac{(SplitTime - \text{time}_{start})(\text{time}_{end} - SplitTime)}{ABS(SplitTime - \text{mode}_{nearest}) + \left(\frac{\text{time}_{end} - \text{time}_{start}}{2}\right)}$$

wherein QF is the quality factor, Ne is a number of data points in the nearest cluster mode, SplitTime is the shifted split time, $\text{time}_{start}$ is a start time of the nearest cluster mode, time end is an end time of the nearest cluster mode, and $\text{mode}_{nearest}$ is a time of the nearest cluster mode determined by the clustering algorithm.

5. The method of claim 3, further comprising:
checking that each of the plurality of shifted split times of the best shift time candidate is greater than one orbit period from the zero split time;
in response to determining that a shifted split time of the plurality of shifted split times of the best shift time candidate is less than one orbit period from the zero split time, removing the shifted split time from the plurality of optimal split times;
checking that each of the plurality of shifted split times of the best shift time candidate is greater than one orbit period from the last recorded beacon split time; and
in response to determining that a shifted split time of the plurality of shifted split times of the best shift time candidate is less than one orbit period from the last recorded beacon split time, removing the shifted split time from the plurality of optimal split times.

6. The method of claim 1, wherein calculating, via a clustering algorithm, a plurality of cluster modes, comprises using a non-parametric mean-shift cluster algorithm as the clustering algorithm.

7. The method of claim 6, wherein the non-parametric mean-shift cluster algorithm includes a kernel density estimation (KDE).

8. The method of claim 7, wherein a bandwidth of the KDE is approximately 30 seconds.

9. The method of claim 1, further comprising:
determining whether there is an extrema point in the beacon drift; and
further selecting the plurality of optimal split times based on the extrema point of the beacon drift.

10. The method of claim 9, further comprising:
in response to determining that there is an extrema point in the beacon drift, calculating an extrema cluster based on the extrema point; and
adding the extrema cluster to the plurality of cluster modes.

11. A system for determining a location of at least one wireless device, the system comprising:
at least one memory with computer-executable instructions stored thereon, the computer-executable instructions when executed by one or more processors of the system cause the one or more processors to perform operations comprising:
receiving, at a measuring station, a plurality of beacons transmitted from a wireless device;
identifying, for the plurality of beacons, a plurality of Times of Arrival (TOAs), a plurality of Times of Departures (TODs), and a plurality of locations of the measuring station at which the plurality of beacons are received;
determining, for the plurality of beacons, a plurality of Times of Flight (TOFs) based at least in part on the plurality of TOAs and the plurality of TODs;
determining an orbit period of the measuring station based on the plurality of locations;
calculating a plurality of split time candidates based on the orbit period;
calculating, via a clustering algorithm, a plurality of cluster modes for the plurality of TOAs;
calculating a beacon drift based on a difference between a plurality of estimated distances between the wireless device and the measuring station and a plurality of distances derived from the plurality of TOFs;
selecting a plurality of optimal split times based, at least in part, on the plurality of split time candidates, the plurality of cluster modes, and the beacon drift;
generating a plurality of circular error probability (CEP) ellipses corresponding to the plurality of optimal split times;
merging the plurality of CEP ellipses to produce a merged CEP ellipse; and
determining a location of the wireless device based, at least in part, on the merged CEP ellipse.

12. The system of claim 11, wherein calculating the plurality of split time candidates, comprises:
creating a split time template (STT) having a plurality of split times corresponding to orbit times of the measuring station; and
shifting the STT, in steps of T seconds, across a time period that covers at least the orbit period of the measuring station to provide the plurality of split time candidates, wherein each split time candidate includes a plurality of shifted split times.

13. The system of claim 12, wherein selecting the plurality of optimal split times based on the plurality of split time candidates, the plurality of cluster modes, and the beacon drift, comprises:
for each split time candidate of the plurality of split time candidates:
calculating a quality factor, for each shifted split time of the plurality of shifted split times, based on a cluster mode of the plurality of cluster modes that is closest in time to the shifted split time; and
summing the quality factors for the plurality of shifted split times;
identifying a best shift time candidate from the plurality of shift time candidates having a maximum summed quality factor;
selecting the plurality of shifted split times of the best shift time candidate as the plurality of optimal split times; and
adding a zero split time and a last recorded beacon split time to the plurality of optimal split times.

14. The system of claim 13, wherein the quality factor for each shifted split time is defined by:

$$QF = N_c \frac{(SplitTime - \text{time}_{start})(\text{time}_{end} - SplitTime)}{ABS(SplitTime - \text{mode}_{nearest}) + \left(\frac{\text{time}_{end} - \text{time}_{start}}{2}\right)}$$

wherein QF is the quality factor, $N_c$ is a number of data points in the nearest cluster mode, SplitTime is the shifted split time, $time_{start}$ is a start time of the nearest cluster mode, time end is an end time of the nearest cluster mode, and $mode_{nearest}$ is a time of the nearest cluster mode determined by the clustering algorithm.

15. The system of claim 13, wherein execution of the computer-executable instructions further cause the at least one processor to perform operations comprising:
- checking that each of the plurality of shifted split times of the best shift time candidate is greater than one orbit period from the zero split time;
- in response to determining that a shifted split time of the plurality of shifted split times of the best shift time candidate is less than one orbit period from the zero split time, removing the shifted split time from the plurality of optimal split times;
- checking that each of the plurality of shifted split times of the best shift time candidate is greater than one orbit period from the last recorded beacon split time; and
- in response to determining that a shifted split time of the plurality of shifted split times of the best shift time candidate is less than one orbit period from the last recorded beacon split time, removing the shifted split time from the plurality of optimal split times.

16. The system of claim 11, wherein calculating, via a clustering algorithm, a plurality of cluster modes, comprises using a non-parametric mean-shift cluster algorithm as the clustering algorithm.

17. The system of claim 16, wherein the non-parametric mean-shift cluster algorithm includes a kernel density estimation (KDE).

18. The system of claim 17, wherein a bandwidth of the KDE is approximately 30 seconds.

19. The system of claim 11, wherein execution of the computer-executable instructions further cause the at least one processor to perform operations comprising:
- determining whether there is an extrema point in the beacon drift; and
- further selecting the plurality of optimal split times based on the extrema point of the beacon drift.

20. The system of claim 19, wherein execution of the computer-executable instructions further cause the at least one processor to perform operations comprising:
- in response to determining that there is an extrema point in the beacon drift, calculating an extrema cluster based on the extrema point; and
- adding the extrema cluster to the plurality of cluster modes.

* * * * *